US010680969B1

(12) United States Patent
Quinn et al.

(10) Patent No.: US 10,680,969 B1
(45) Date of Patent: Jun. 9, 2020

(54) METHODS AND APPARATUS FOR ALLOCATING HOST RESOURCES TO VIRTUAL MACHINES

(71) Applicant: Amazon Technologies, Inc., Seattle, WA (US)

(72) Inventors: Michael Phillip Quinn, Seattle, WA (US); Diwakar Gupta, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 193 days.

(21) Appl. No.: 15/836,612

(22) Filed: Dec. 8, 2017

(51) Int. Cl.
*G06F 15/173* (2006.01)
*H04L 12/911* (2013.01)
*G06F 9/455* (2018.01)
*G06F 9/50* (2006.01)

(52) U.S. Cl.
CPC .......... *H04L 47/70* (2013.01); *G06F 9/45558* (2013.01); *G06F 9/5077* (2013.01); *G06F 2009/45591* (2013.01)

(58) Field of Classification Search
CPC ......... G06F 9/45558; G06F 2009/4557; G06F 2009/45575; H04L 47/78; H04L 47/781; H04L 47/783
See application file for complete search history.

(56) References Cited

U.S. PATENT DOCUMENTS 9,471,352 B1* 10/2016 Mauer ................. G06F 9/45558
2007/0198656 A1* 8/2007 Mazzaferri ........... G06F 3/1415
709/218

* cited by examiner

*Primary Examiner* — Yves Dalencourt
(74) *Attorney, Agent, or Firm* — Robert C. Kowert; Kowert, Hood, Munyon, Rankin & Goetzel, P.C.

(57) ABSTRACT

Methods and apparatus for dynamically allocating host resources (e.g., CPUs, GPUs, etc.) to virtual machines (VMs) on host devices in a provider network. The host devices may be provisioned with quantities of each resource type. Customers may request different combinations and quantities of resources for their VMs. Upon receiving a placement request for a VM, a host device is located that can provide a requested combination and quantity of resources for the VM. The host can then be directed to attach at least the requested combination and quantity of host resources to the VM. Future demand for VMs with particular combinations and quantities of resources can be predicted, and logical slots can be predefined in the control plane in anticipation of that demand. If a customer's VM is provided with more resources than requested, the customer may release or sell the extra resources.

20 Claims, 19 Drawing Sheets

Figure 10:
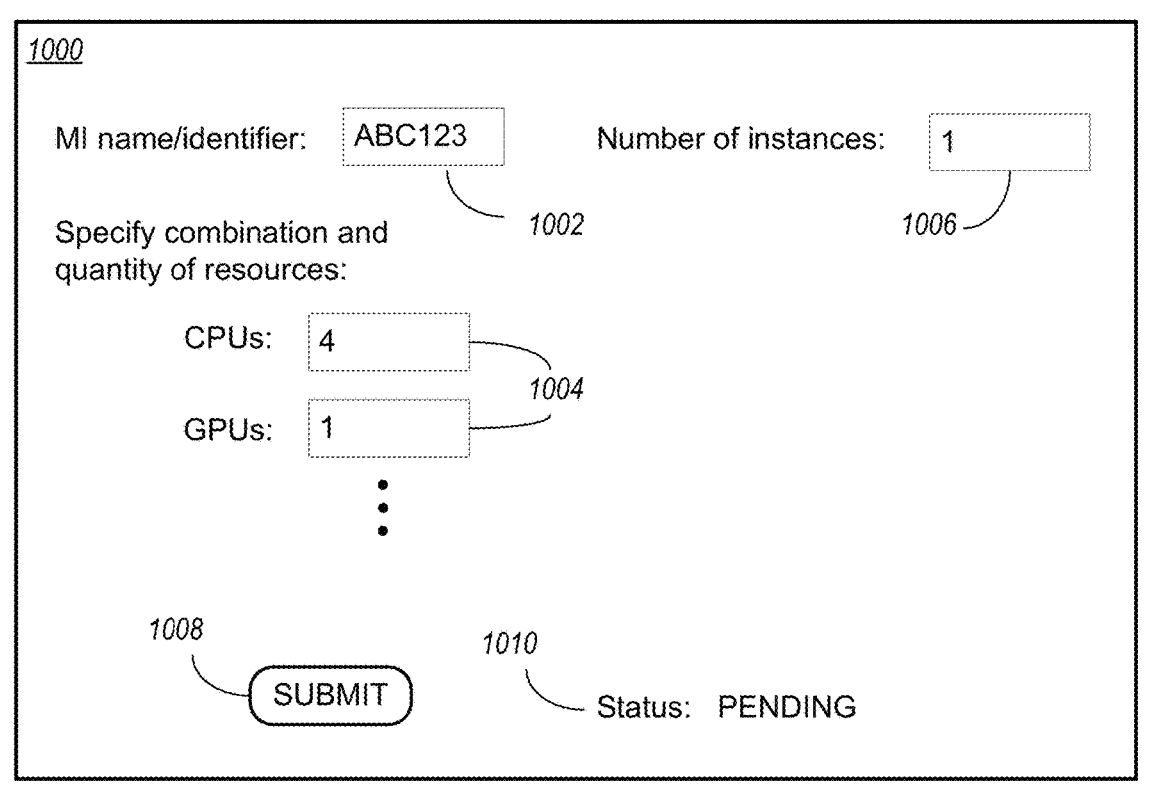

*1000*

MI name/identifier: [ABC123] — *1002*

Number of instances: [1] — *1006*

Specify combination and quantity of resources:

CPUs: [4]
GPUs: [1]
⋮

*1004*

*1008* (SUBMIT)   *1010* Status: PENDING

METHODS AND APPARATUS FOR ALLOCATING HOST RESOURCES TO VIRTUAL MACHINES

BACKGROUND

Many companies and other organizations operate computer networks that interconnect numerous computer systems to support their operations, such as with the computer systems being co-located (e.g., as part of a local network) or instead located in multiple distinct geographical locations (e.g., connected via one or more private or public intermediate networks). For example, data centers housing significant numbers of interconnected computer systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers.

BRIEF DESCRIPTION OF THE DRAWINGS

FIG. 10 illustrates an example user interface for specifying quantities and combinations of host resources for VMs, according to some embodiments.

Figure 1:
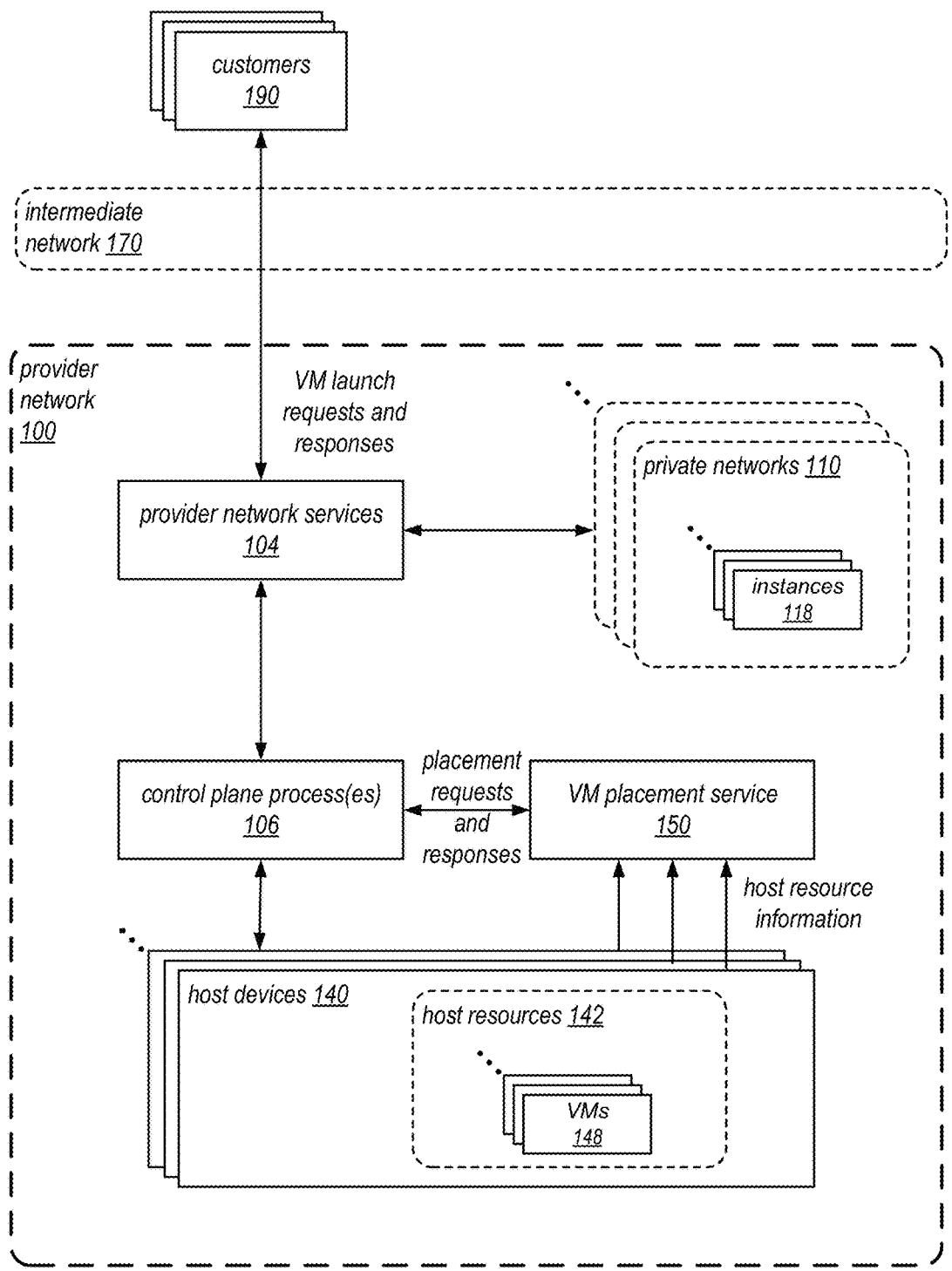
FIG. 1 illustrates host devices that provide resources to virtual machines (VMs) and a VM placement service that locates suitable host devices for deploying VMs in a provider network environment, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of methods and apparatus for allocating host device resources to virtual machines (VMs) in provider network environments are described. Embodiments of a VM resource allocation system that are described herein may be used to dynamically allocate host resources (e.g., CPUs or CPU cores, GPUs, memory, disk, networking resources, accelerators, FPGAs, etc.) for VMs on host devices. In embodiments of the VM resource allocation system, instead of pre-configuring pools of homogeneous host devices with slots that include fixed amounts of one or more resources for particular instance types as in conventional provider networks, host devices may be provisioned with quantities of the different resource types. Instead of assigning VMs to predefined slots on host devices corresponding to instance types with fixed amounts of one or more resources on the host devices, slots including different combinations and quantities of host resources may be dynamically defined and managed in the control plane of the provider network, for example by a service (referred to as a VM placement service) that tracks resource allocation on the host devices and dynamically determines slots for VMs in response to VM placement requests. Thus, in embodiments of the VM resource allocation system, slots are logical constructs that are dynamically defined and managed in the control plane of the provider network, rather than logical constructs that are predefined on the host devices as in conventional provider networks.

In embodiments of the VM resource allocation system, instead of requesting particular instance types for their VMs as in conventional systems, customers may request different combinations and quantities of host resources for their VMs. For example, customer(s) may request two CPUs and one GPU for one VM, one CPU and no GPUs for another VM, one CPU and an accelerator for yet another VM, and so on. The VM resource allocation system may then determine slots that include the requested resources on host devices for the respective VMs. In some embodiments, slots for the VMs can be dynamically defined in the control plane by the VM resource allocation system in response to the customer requests. In some embodiments, at least some slots may be predefined in the control plane, and one or more of the slots for the VMs may be selected from the predefined slots. A control plane process that directs respective host devices to assign the host resources indicated by the determined slots to the VMs, and to launch the VMs.

In some embodiments, a slot may be determined for a VM that includes more than the requested quantity of at least one resource type. In some embodiments, the respective customer may release or sell the extra resource(s) to be assigned to other VMs on the host device. For example, a customer may request twelve CPU cores for their VM. A slot may be determined for the VM that has a CPU with sixteen CPU cores and one GPU. The customer may then release or sell the GPU along with four CPU cores to be used in an additional slot for deploying and executing a VM that requires a GPU. As another example, a customer may request a slot with a GPU and four CPU cores for their VM. A slot may be determined for the VM that has a CPU with sixteen CPU cores and one GPU. The customer may then release or sell twelve of the CPU cores to be used in an additional slot for deploying and executing a VM.

Embodiments of the VM resource allocation system may include a VM placement service that executes on one or more devices on the provider network, for example as a service in the control plane of the provider network. A customer may submit a VM launch request that specifies a combination and quantity of host resources for the particular VM, for example via a user interface and API to a provider network service. A placement request for the VM may then be submitted to the VM placement service. Upon receiving the placement request for the VM, the VM placement service may locate a host device on the provider network that can provide the specified combination and quantity of resources for the VM. The VM placement service may determine a slot for launching the respective VM on the host device; the slot indicates the host resources to be assigned to the respective VM on the host device. In some embodiments, slots for the VMs can be dynamically defined in the control plane by the VM placement service in response to the placement requests. In some embodiments, the VM placement service may predefine slots in the control plane, for example based on predicted demand for host resources; the VM placement service may store the predefined slots, and at least some of the slots for the VMs may be selected from the predefined slots. Once a slot is determined for a VM, the VM placement service provides the slot to a control plane process that directs a respective host device to assign the host resources indicated in the determined slot to the VM, and then to launch the VM.

In some embodiments, the VM placement service may collect and store resource information for the host devices on the provider network. The resource information for a given host device may indicate amounts of host resources on the host device (e.g., ten CPUs, four GPUs, N terabytes of storage, M gigabytes of memory, etc.), may identify particular resources (e.g., CPUs 1—16, GPUs 1—4, disks 1—8, NICs 1—8, etc.) on each host device, and may indicate the current allocation status of the resources on each host device to logical slots for the host device in the control plane and assignment of the slots to particular VMs on the host device. In some embodiments, the resource information may also include resource utilization information (e.g., VM A is utilizing 70% of its CPU resources and 30% of its networking resources, VM B is utilizing 50% of its GPU resources and 100% of its networking resources, etc.) In some embodiments, the resource information for the host device(s) may be analyzed by the VM placement service to predict future demand for placement of VMs with particular combinations and quantities of resources, and slots can be predefined in the control plane in anticipation of that demand. In some embodiments, the resource information for the host device(s) may be analyzed by the VM placement service to locate suitable host devices for requested VMs and to dynamically define slots for the VMs.

Embodiments of the VM placement service may provide more flexibility in provisioning data centers of a provider network with host devices than is provided in conventional provider network environments, and also provide more flexibility to customers of the provider network when provisioning VMs with desired host resources. Conventionally, in provider network environments that include host devices that execute VMs, pools of homogeneous host devices are configured with slots that include fixed amounts of one or more resources for particular instance types. Different ones of the pools include host devices with different configurations of slots that provide resources corresponding to different instance types. For example, a first pool may include host devices that include CPUs and provide slots with 16 CPU cores and a set amount of memory, storage, and network resources for a first instance type, a second pool may include host devices that that include CPUs and GPUs and provide slots with 4 CPU cores, a GPU, and a set amount of memory, storage, and network resources for a second instance type, a third pool may include host devices that that include CPUs and GPUs and provide slots with two CPUs, four GPUs, and a set amount of memory, storage, and network resources for a third instance type, a fourth pool may include host devices that include CPUs and accelerators that provide slots with a CPU, an accelerator, and a set amount of memory, storage, and network resources for a fourth instance type, and so on.

In these conventional systems, if a customer wants an accelerator FPGA, GPU, or other specialized hardware for their VM, the customer selects from one or two predefined instance types that include those resources. A selected instance type, however, may include additional resources that the customer's VM does not need or more resources of a type than the customer's VM needs. A predefined slot on a host device is then located for launching the customer's VM. However, if there are no available slots of an instance type to support the combination of resources the customer wants, the customer may have to wait for a slot to become available, or wait for additional host devices with preconfigured slots for those instance types to be added to the pool. Further, there may not be an instance type that includes the combination and/or quantity of resources that the customer wants. To support changes in demand for the different instance types, new host devices with the necessary hardware resources are added and preconfigured with slots to support the instance types, or alternatively existing host devices with the necessary hardware resources are reconfigured with slots to support different instance types.

The VM placement service enables host devices provisioned with different quantities and combinations of different resource types (e.g., CPUs, GPUs, memory, disk, networking resources, accelerators, FPGAs, etc.) to be spread across the fleet of host devices in the data centers of a provider network. These host devices are not preconfigured with slots to support different instance types. Instead, slots that indicate host resources to be assigned to VMs on host devices may be dynamically determined in the control plane by the VM placement service. Instead of selecting from a set of predefined instance types for their VMs, customers can specify particular sets of host resources for their VMs, essentially allowing customers to define their own custom instance types that include different quantities and combinations of different resource types (e.g., CPUs, GPUs, memory, disk, networking resources, accelerators, FPGAs, etc.). Upon receiving a VM launch request from a customer that specifies a set of host resources for the VM, the VM placement service may locate one of the host devices that includes the host resources specified by the customer, define a slot for the VM that includes those host resources on that host device, and provide the slot definition to a control plane process that then directs the host device to attach or associate the resources indicated by the slot to the VM and launch the VM.

Figure 2:
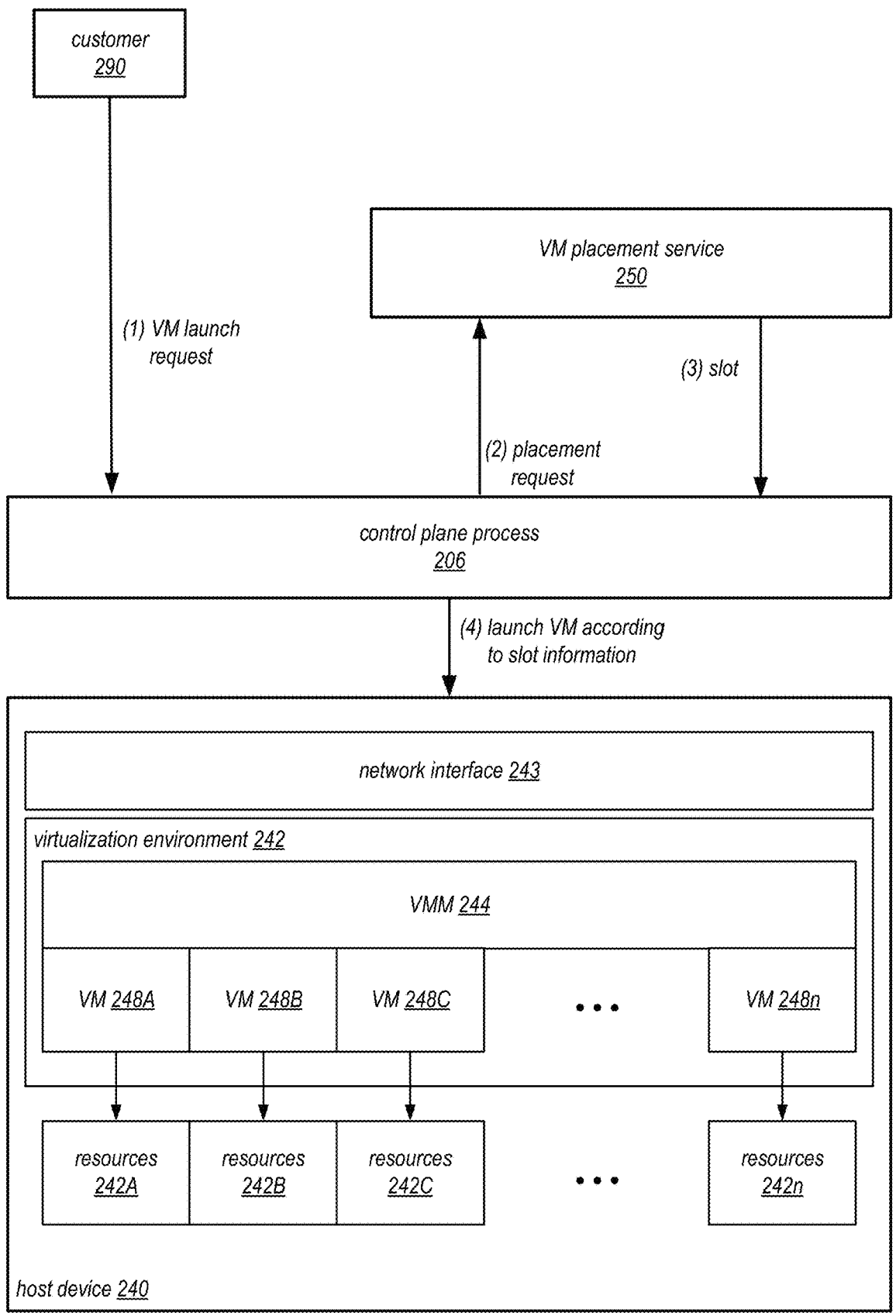
FIG. 2 illustrates a host device, according to some embodiments.

FIG. 1 illustrates an example provider network environment in which the VM resource allocation system may be implemented, according to some embodiments. FIG. 1 shows a provider network 100 that includes host devices 140 that provide resources 142 to virtual machines (VMs) 148, and a VM placement service 150 that locates suitable host devices 140 for deploying VMs 148 and dynamically determines slots on the host devices 140 that indicate host resources 142 to be assigned to VMs 148 on the host devices 140. In at least some embodiments of a provider network 100, at least some of the resources provided to customers 190 via the provider network 100 may be virtualized computing resources (also referred to as virtual machines (VMs)) executed on multi-tenant hardware that is shared with other customer(s) 190 and/or on hardware dedicated to a particular customer 190. A host device 140 may be a computing device on the provider network 100 that is provisioned with quantities of different resource 142 types (e.g., CPUs, GPUs, memory, disk, networking resources, accelerators, FPGAs, etc.). Each VM 148 on a host device 140 may be provisioned with some quantity and combination of the host resources 142 (e.g., CPUs, GPUs, memory, disk, networking resources, accelerators, FPGAs, etc.) on the respective host device 140. FIG. 2 illustrates an example host device 140 in more detail.

The provider network 100 may provide one or more services 104 implemented by computer systems comprising one or more computing devices on the provider network 100 that provide user interfaces and APIs via which customers 190 may request launches of VMs 148 with different combinations and quantities of host resources 142 for their respective provider network implementations, for example for their private networks 110 on the provider network 100, via an intermediate network 170 such as the Internet. Upon receiving a launch request from a customer, a suitable host device 140 is located by the VM placement service 150, a slot on the host device 140 is defined in the control plane by the VM placement service 150, and a VM 148 is launched by a control plane process 106 on the host device 140 that is configured to use the host resources 142 indicated by the slot definition. The VM 148 then appears as a resource instance 118 in the client's private network 110.

In some embodiments, when a provider network service 104 receives a VM launch request from a customer 190 (or from some other requestor, such as another provider network service) that specifies a combination and quantity of host resources for the VM, the provider network service 104 may send the launch request to a control plane process 106. The control plane process 106 may then send a placement request to the VM placement service 150 requesting a host device 140 and slot for launching the VM. The VM placement service 150 may then locate a host device 140 that can provide the requested combination and quantity of resources for the VM, defines a slot for the host device 140 that includes the requested combination and quantity of resources, and responds to the control plane process 106 indicating the target host device 140 and providing the slot definition. The control plane process 106 may then direct the target host device 140 to attach the host resources indicated by the slot definition to the VM, and launch the VM.

Figure 15:
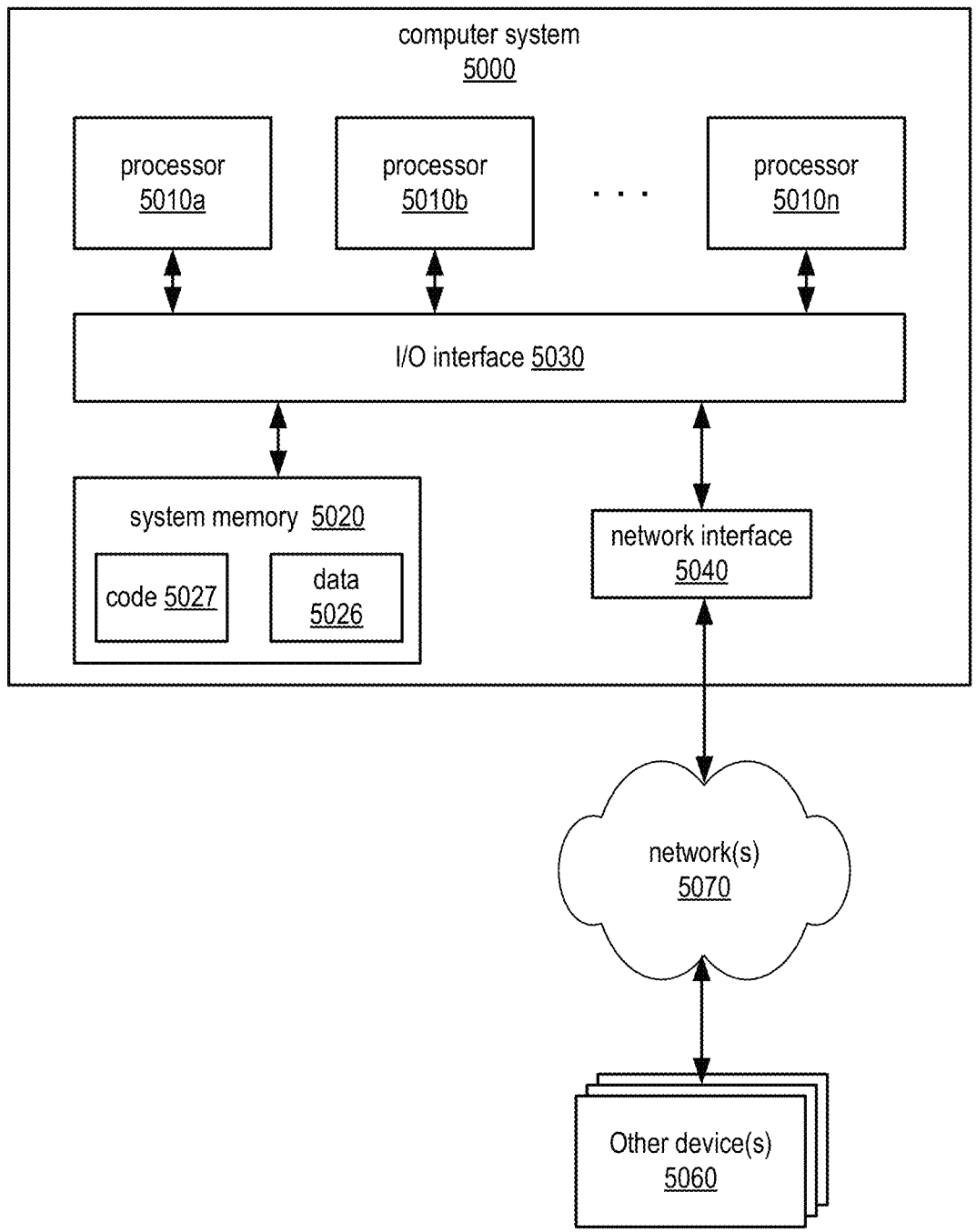
FIG. 15 is a block diagram illustrating an example computer system that may be used in some embodiments.

FIG. 2 illustrates an example host device, according to some embodiments. A host device 240 is a computer system that provides a virtualization environment 242 for virtual machines (VMs) 248 in a provider network environment. Host device 240 may, for example, be a rack-mount server, a blade server, a stand-alone server, or a system on a chip (SoC). An example computer system that may be used as a host device 240 is illustrated in FIG. 15. The host device 240 includes host resources 242 (e.g., one or more of CPUs, GPUs, memory, disk, networking resources, accelerators, FPGAs etc.) that can be assigned to VMs 248 when launched on the host device 240. For example, resources 242A may be assigned to VM 248A, resources 242B may be assigned to VM 248B, resources 242C may be assigned to VM 248C, and so on. Note that host device 240 may include resources 242 that are not assigned to a VM 248 on the host device 240.

VMs 248A-248n may execute on host device 240 according to hardware virtualization technology that enables multiple operating systems to run concurrently on the host device 240. A hypervisor, or virtual machine monitor (VMM) 244, on the host device 240 presents the VMs 248A-248n on the respective host 240 with a virtual platform and monitors the execution of the VMs 248A-248n on the host 240. The VMM 244 and VMs 248A-248n may be executed by components of the host device 240, for example processor(s) and memory of the host device 240. Each VM 248 on the host device 240 may be provided with one or more IP addresses; the VMM 240 on the host device 240 may be aware of the IP addresses of the VMs 248A-248n on the host device 240. In some embodiments, the host device 240 may also include a network interface 243 that processes network traffic (e.g., packet flows) between VMs 248A-248n on the host device 240 and the provider network. Note that components of the network interface 243 (e.g., network interface cards (NICs) and memory on the NICs) as well as networking usage metrics (e.g., burst rate, throttling, and total bandwidth utilization for network ingress and for network egress) may be included in host resources 242 that can be assigned to VMs 248 on the host device 240.

At (1) in FIG. 2, a control plane process 206 may receive a VM launch request, for example a VM launch request submitted by a customer 290 via a user interface and API to a provider network service. The VM launch request specifies a combination and quantity of host resources 242 for the customer 290's VM. At (2), a placement request for the VM may be submitted to the VM placement service 250. Upon receiving the placement request for the VM 244, the VM placement service 250 locates a host device 240 on the provider network that can provide the specified combination and quantity of host resources 242 for the VM 244. The VM placement service 250 determines a slot that includes the host resources 242 to be assigned to the VM 244. The slot may be dynamically defined in the control plane by the VM placement service 250 in response to the placement request based on resource usage information for the host device 240. However, in some embodiments, the VM placement service 250 may predefine one or more slots for the host device 240, for example based on predicted demand for host resources, and the slot may be selected from the predefined slots. At (3), once a slot is determined for the VM 244, the VM placement service provides the slot to control plane process 206. At (4), the control plane process 206 directs the host device 240 to assign the host resources 242 indicated in the determined slot to the VM 244 and launch the VM 244.

Figure 3:
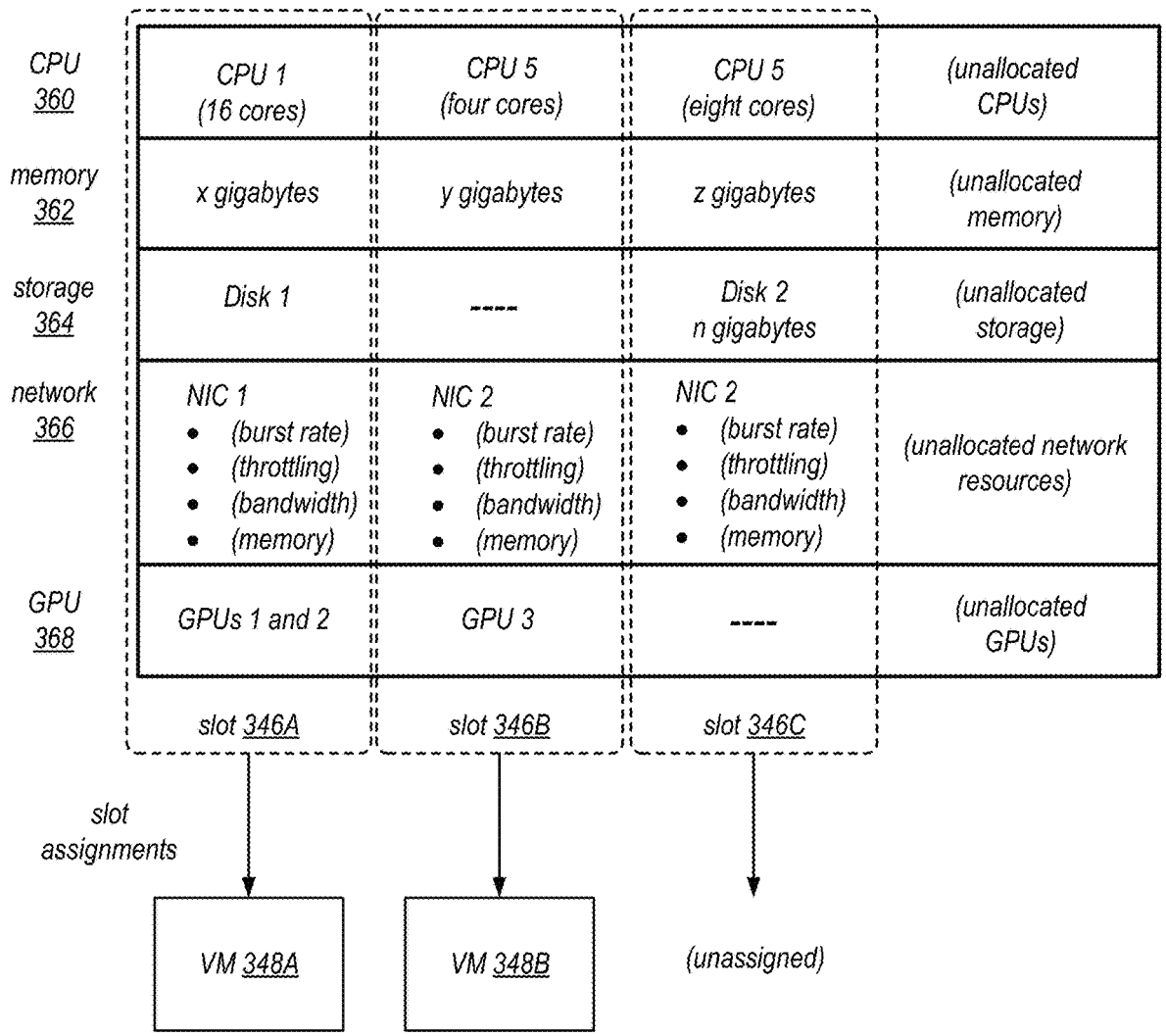
FIG. 3 illustrates host resource allocation to slots for a host device, according to some embodiments.
Figure 4A:
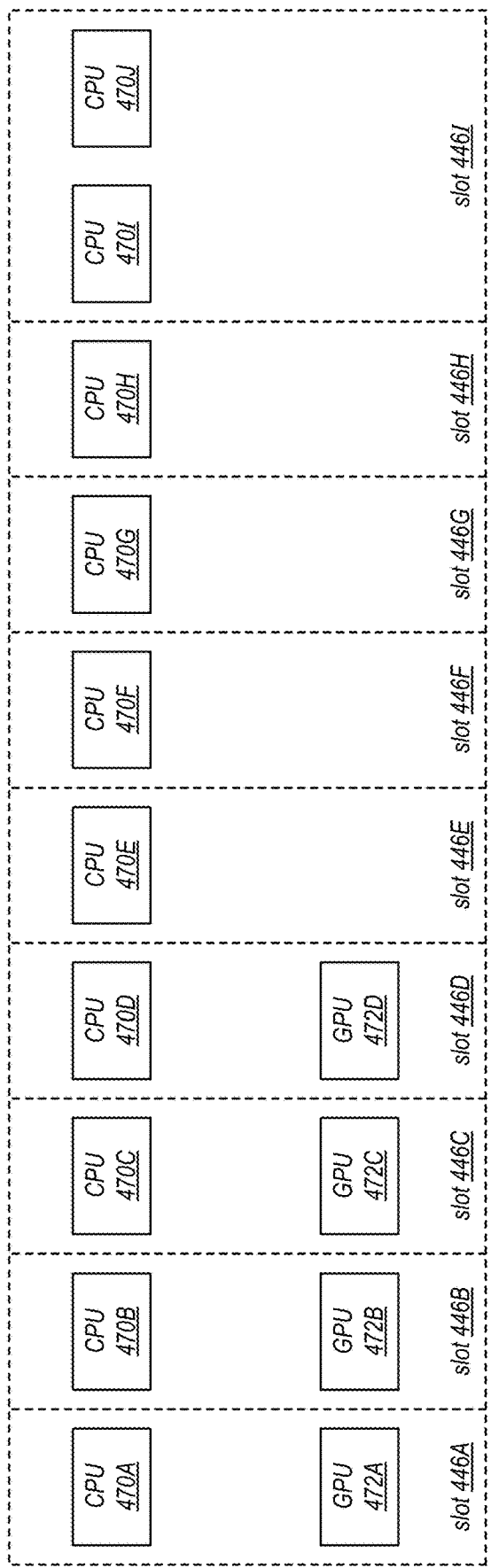
FIG. 4A illustrates slots that include different combinations and quantities of host resources, according to some embodiments.
Figure 4B:
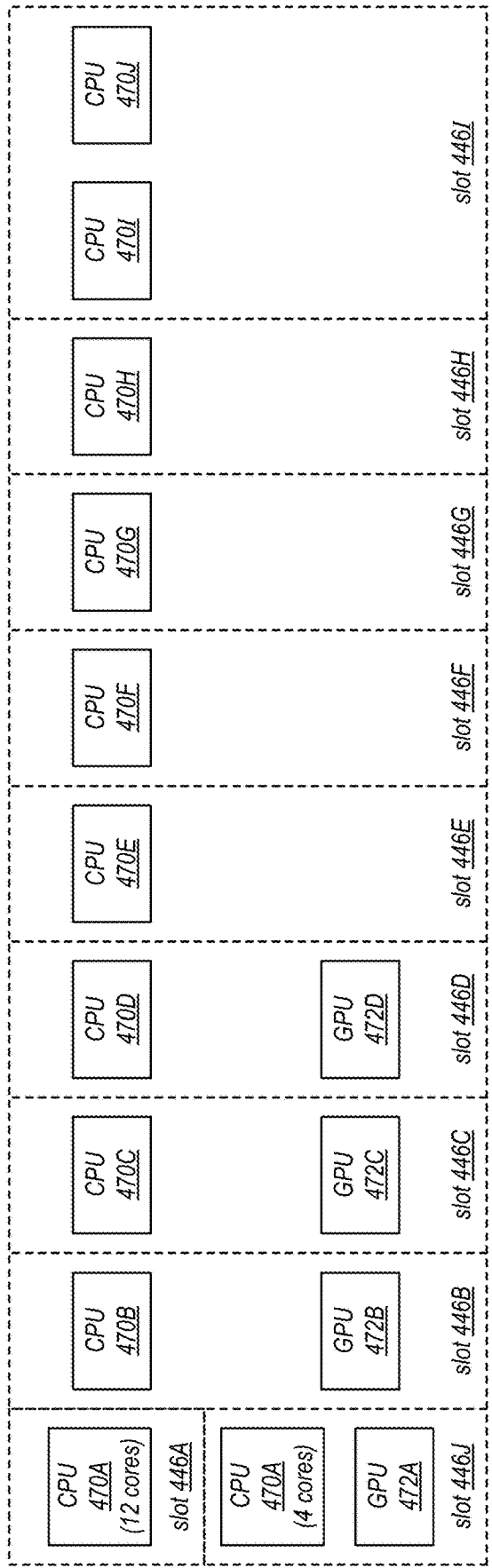
FIG. 4B illustrates releasing a host resource from one slot to provide an additional slot, according to some embodiments.

FIG. 3 illustrates host resource allocation to slots for a host device, according to some embodiments. A host device 340 on a provider network may include host resources including one or more of, but not limited to, CPUs 360, memory 362, storage 364, network 366, and GPU 368 resources. As a non-limiting example, a host device 340 may include twelve 16-core CPUs (CPUs 1 through 12), N gigabytes of memory, eight disks (disks 1 through 8) that provide M terabytes of storage, six NICs (NICs 1 through 6), and four GPUs (GPUs 1 through 4). As illustrated in FIG. 3, slots 346 for VMs 348 may be defined for the host device 340 in the control plane of the provider network by the VM placement service, for example as illustrated in FIG. 2. Each slot 346 may be provisioned with some amount of one or more of the host resources (e.g., CPUs 360, GPUs 368, memory 362, storage 364, network 366, etc.) of the host device 340. Different slots 346 may be provisioned with different combinations and quantities of the host resources of the host device 340. The VMs 348 executing on the host device 340 may thus be provisioned with different combinations and quantities of the host resources of the host device 340. In some embodiments, at least some of the slots 346 may be predefined by the VM placement service in the control plane with different combinations and quantities of host resources, for example as illustrated in FIGS. 4A and 4B. A predefined slot 346 may be determined for and associated with a VM 348 by the VM placement service in response to a VM placement request. However, in some embodiments, at least some of the host resources (e.g., CPUs 360, GPUs 368, memory 362, storage 364, network 366, etc.) are not predefined into slots 346, but are instead available to be included in dynamically defined slots 346 for VMs 348 with different combinations and quantities of the host resources by the VM placement service in response to VM placement requests, for example as illustrated in FIGS. 5A through 5D.

FIG. 3 shows three non-limiting example slots 346 defined by the VM placement service in the control plane. A slot 346 may indicate the specific host resources to be used by a respective VM 348. In some embodiments, at least some of the host resources may be shared by one or more VMs 348. Thus, a slot 346 may also define amounts or usage limits for one or more of the host resources. For example, for network 366 resources, a slot 346 may define a particular NIC to be used by the respective VM 348, and may also define burst rate, throttling, bandwidth, and memory usage limits for the respective VM 348. As another example, for CPU 360 resources, a slot 346 may define a particular CPU or CPUs to be used by the respective VM 348, may define the number of CPU cores to be used by the respective VM 348, and may also define CPU usage limits (e.g., burst rate) for the respective VM 348. As another example, for storage 364 resources, a slot 346 may define a specific disk or disks to be used by the respective VM 348, and may also define an amount of storage space (e.g., in gigabytes or terabytes) that the respective VM 348 is allocated on a disk.

In this example, slot 346A includes CPU 1 (16 cores), x gigabytes of memory 362, disk 1, NIC 1, and GPUs 1 and 2, and is associated with or assigned to VM 348A. In addition, resource usage limits including but not limited to network 366 burst rate, throttling, bandwidth, and memory usage limits may be defined for the respective VM 348A.

Slot 346B includes CPU 5 (four cores), y gigabytes of memory 362, no disk, NIC 2, and GPU 3, and is associated with or assigned to VM 348B. In addition, resource usage limits including but not limited to network 366 burst rate, throttling, bandwidth, and memory usage limits may be defined for the respective VM 348B. Slot 346C includes CPU 5 (eight cores), z gigabytes of memory 362, n gigabytes on disk 2, NIC 2, and no GPU, and is not associated with or assigned to a VM. In addition, resource usage limits including but not limited to network 366 burst rate, throttling, bandwidth, and memory usage limits may be defined for the slot 346C. Slot 346C may, for example, represent a predefined slot in the control plane that has not yet been assigned to or associated with a VM 348 on the host device 340. Slots 346A and 346B may have been predefined in the control plane and assigned to their respective VMs 348A and 348B in response to VM placement requests, or alternatively may have been dynamically defined for their respective VMs in response to VM placement requests. Note that some amount of one or more of the host resources (e.g., CPUs 360, GPUs 368, memory 362, storage 364, network 366, etc.) of the host device 340 may be unassigned, and thus may be available to be dynamically assigned to slots 346 for VMs 348 in response to VM placement requests, or to be preassigned to slots 346 for VMs 348 in anticipation of demand for particular slot configurations.

FIG. 4A illustrates slots that include different combinations and quantities of host resources, according to some embodiments. In some embodiments, slots 446 may be dynamically defined in the control plane by the VM placement service in response to VM placement requests. In some embodiments, one or more slots 446 may be predefined in the control plane by the VM placement service in anticipation of demand. FIG. 4A shows a non-limiting example in which nine slots 446A-446I for VMs are defined (dynamically or predefined) in the control plane. Slots 446A-446D each include one CPU 470 and one GPU 472, slots 446E-446H each include one CPU 470 (and no GPU), and slot 446I includes two CPUS 470 (and no GPU). In some embodiments, upon receiving a VM placement request, the VM placement service may dynamically define a slot 446 on the host device for the VM. In some embodiments, upon receiving a VM placement request, the VM placement service may determine an available predefined slot 446 on the host device for the VM. The slot 446 information may be provided to a control plane process that directs the host device to provision the VM with the resources indicated by the slot.

FIG. 4B illustrates releasing a host resource from one slot to provide an additional slot on the host device, according to some embodiments. Slot 446A that includes CPU 470A (e.g., a 16-core CPU) and GPU 472A may be assigned to a VM in response to a customer's VM launch request. However, the customer may only require a CPU 470 for the VM. Thus, as illustrated in FIG. 4B, the customer may release or sell GPU 472A from slot 446A prior to the VM being launched to provide another slot 446J that includes GPU 472A and four cores of CPU 470A.

Figure 5A:
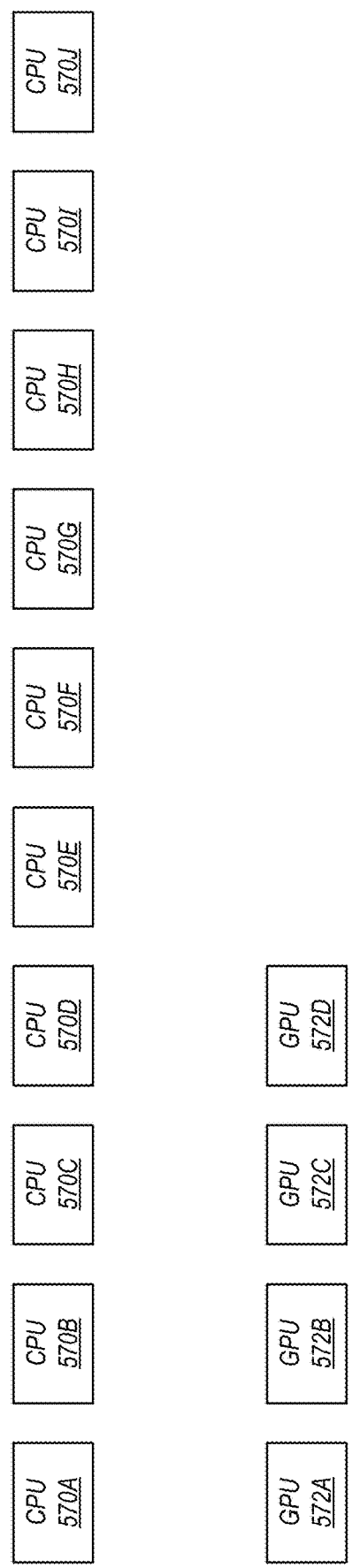
FIGS. 5A through 5D illustrate dynamically allocating slots that include different combinations and quantities of host resources, according to some embodiments.
Figure 5B:
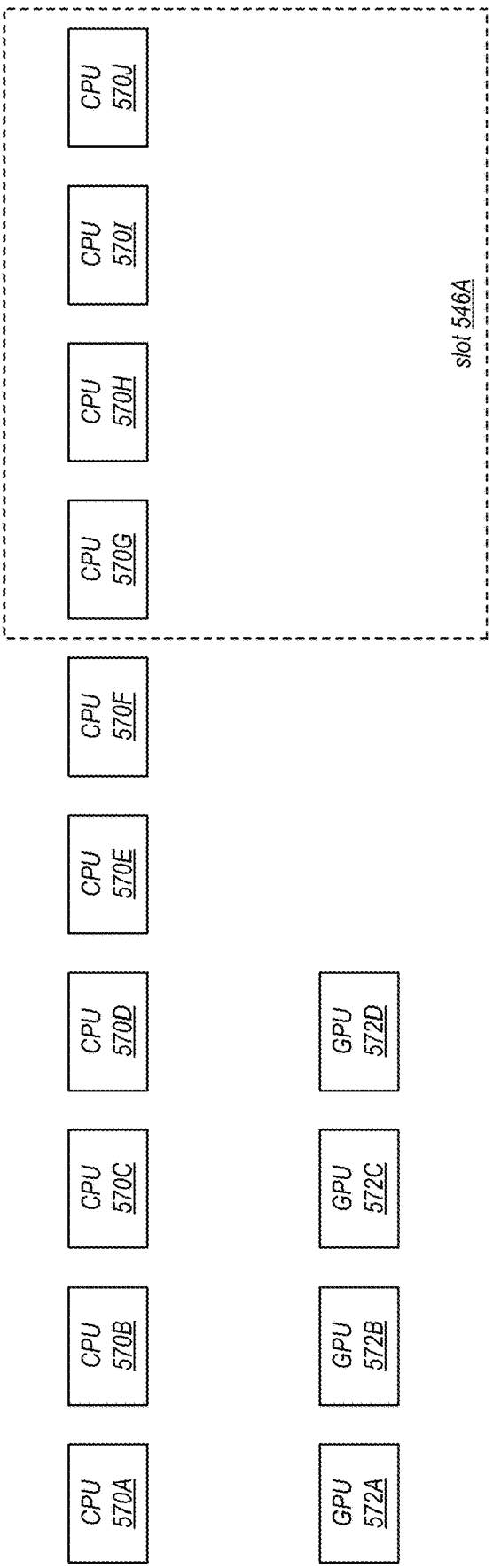
Figure 5C:
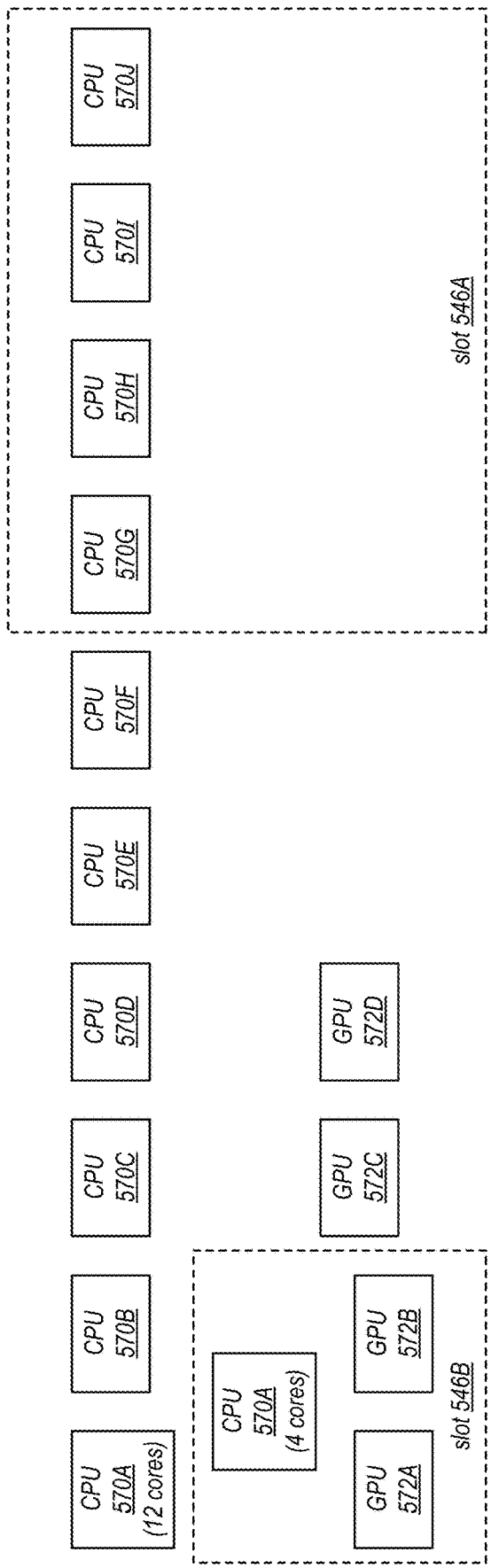
Figure 5D:
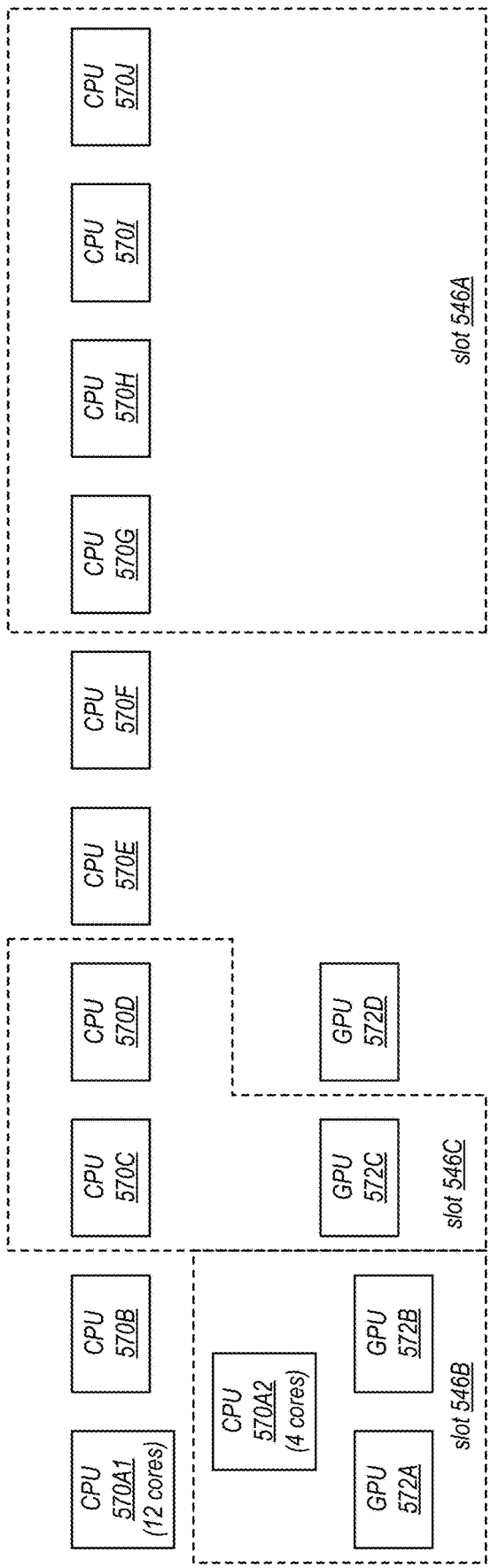

FIGS. 5A through 5D illustrate dynamically allocating slots for a host device that include different combinations and quantities of host resources, according to some embodiments. In some embodiments, at least some of the host resources on a host device may be available (not assigned to slots or VMs), and the host resources may be dynamically assigned by the VM placement service to provide slots for VMs with particular resource requirements in response to launch requests. FIG. 5A shows a non-limiting example in which a host device includes ten CPUs 570A-570J and four GPUS 572A-572D that are not assigned to slots. In FIG. 5B, a customer has submitted a launch request for a VM that specifies four CPUs for the VM; a slot 546A has been dynamically defined for the VM by the VM placement service that includes four CPUs 570G-570J. In FIG. 5C, a customer has submitted a launch request for a VM that specifies two GPUs for the VM; a slot 546B has been dynamically defined for the VM by the VM placement service that includes GPUs 572A and 572B, as well as four cores on CPU 570A. In FIG. 5D, a customer has submitted a launch request for a VM that specifies two CPUs and one GPU for the VM; a slot 546C has been dynamically defined for the VM by the VM placement service that includes CPUs 570C and 570D and that also includes GPU 572C.

Figure 6:
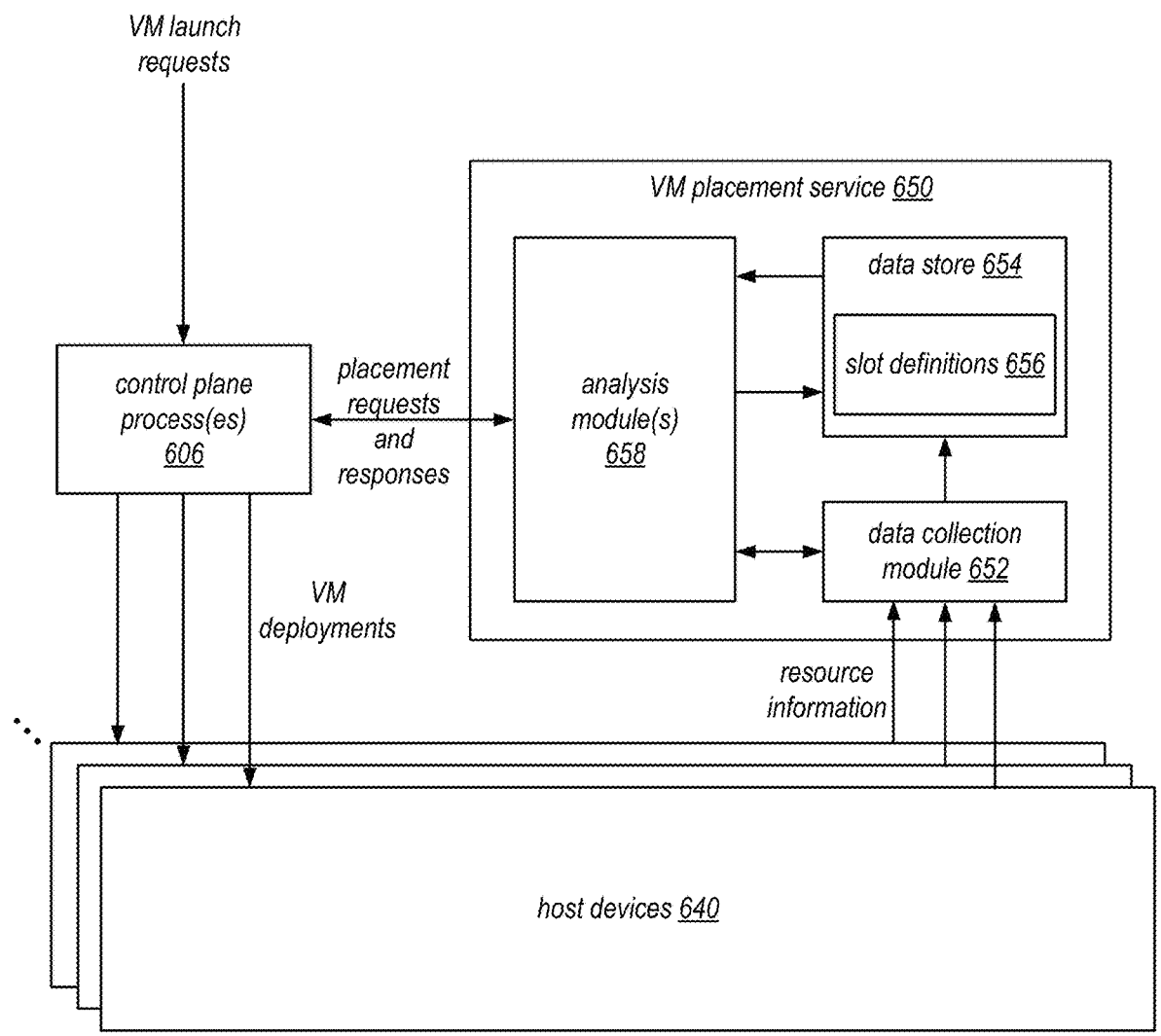
FIG. 6 illustrates components and operations of a VM placement service, according to some embodiments.

FIG. 6 illustrates components and operations of a VM placement service, according to some embodiments. A VM placement service 650 may be implemented by one or more computing devices on the provider network. As illustrated in FIG. 6, a VM placement service 650 may include, but is not limited to, a data collection module 652, a data store 654, and one or more analysis modules 658. Data collection module 652 may collect resource information for the host devices 640 and store to the data store 654 or provide the information to an analysis module 658. The resource information for a given host device 640 in data store 654 may indicate amounts of host resources (e.g., CPUs or CPU cores, GPUs, memory, disk, networking resources, accelerators, FPGAs, etc.) on the host device 640, and may also indicate the current allocation status of the resources to slot definitions 656 and assignments of the slot definitions 656 to VMs on the host device 640. In some embodiments, the resource information may also include resource utilization information (e.g., VM A is utilizing 70% of its CPU resources and 30% of its networking resources, VM B is utilizing 50% of its GPU resources and 100% of its networking resources, etc.)

In some embodiments, the resource information for the host device(s) 640 may be analyzed by an analysis module 658 of the VM placement service 650 in response to a placement request to locate a suitable host device 640 for a requested VM and to dynamically define a slot for the VM; the dynamically defined slot may be provided to a control plane process 606, and may also be stored in slot definitions 656. In some embodiments the VM placement module 650 may predefine slots; the predefined slots may, for example, be stored in slot definitions 656. For example, in some embodiments, the resource information for the host device(s) 640 may be analyzed by an analysis module 658 of the VM placement service 650 to predict future demand for placement of VMs with particular combinations and quantities of resources, and slots can be predefined and stored in slot definitions 656 in anticipation of that demand. An analysis module 658 may then select a host device 640 for a requested VM and a predefined slot for the VM from slot definitions 656 in response to a placement request.

In some embodiments, a provider network service receives a VM launch request from a customer (or from some other requestor, such as another provider network service) that specifies a combination and quantity of host resources for the VM. The provider network service sends the launch request to a control plane process 606. The control plane process 606 may then send a placement request to the VM placement service 650 requesting a host device 640 and slot for launching the VM. An analysis module 658 of the VM placement service 650 may then locate a host device 640 that can provide the requested combination and quantity of resources for the VM, determine a slot for the host device 640 that includes the requested combination and quantity of resources, and respond to the control plane process 606 indicating the target host device 640 and providing the slot definition. The control plane process 606 may then direct the target host device 640 to assign the host resources indicated by the slot definition to the VM, and launch the VM. In some embodiments, the slot may be dynamically determined in response to the placement request. In some embodiments, the slot may be selected from one or more predefined slots for the host device 640.

Figure 7:
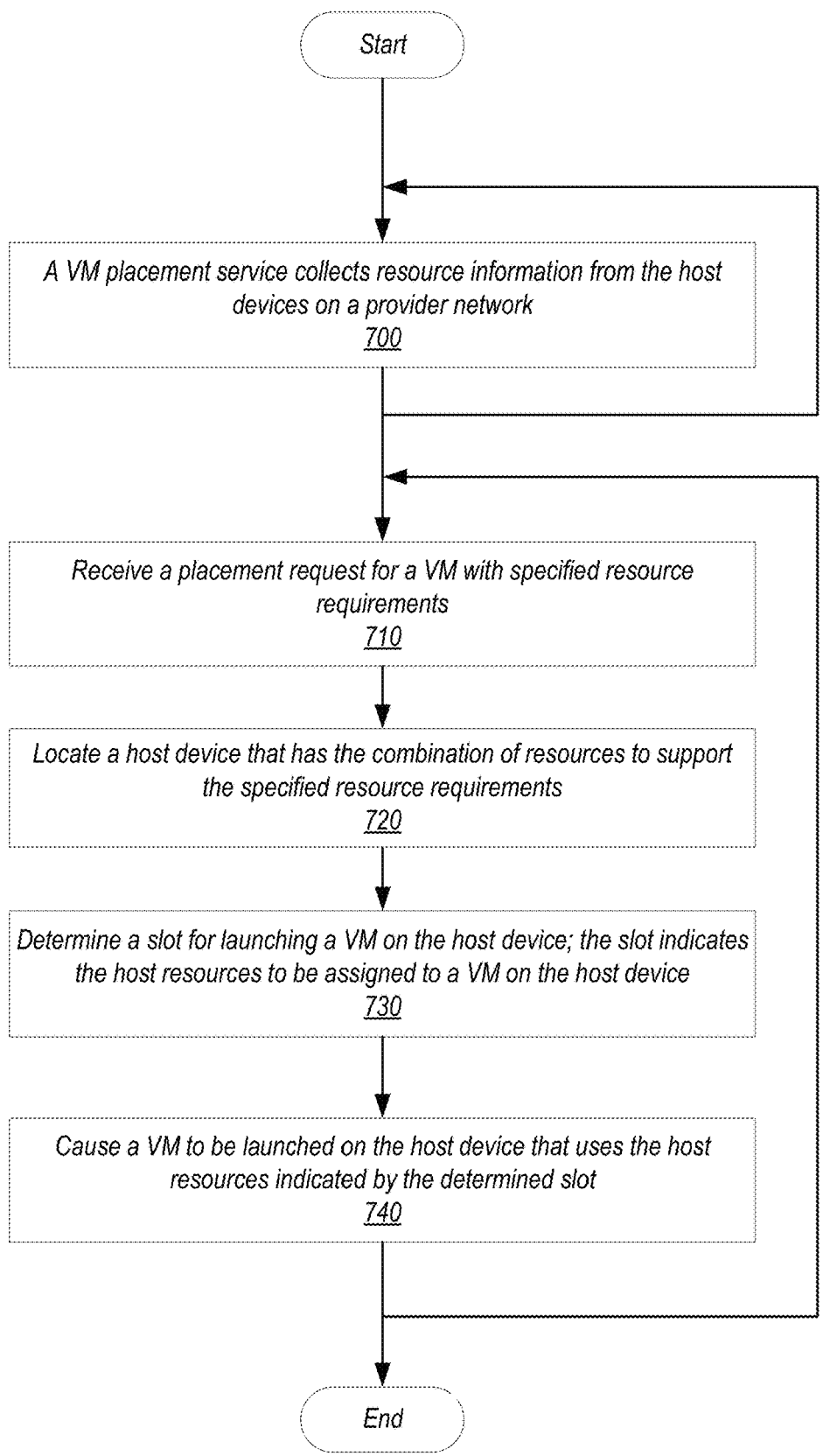
FIG. 7 is a flowchart of a method for placing VMs on host devices in response to VM launch requests, according to some embodiments.

FIG. 7 is a flowchart of a method for placing VMs on host devices in response to VM launch requests, according to some embodiments. As indicated at 700, a VM placement service collects resource information from the host devices on a provider network. The resource information for a given host device may indicate amounts of host resources (e.g., CPUs or CPU cores, GPUs, memory, disk, networking resources, accelerators, FPGAs, etc.) on the host device, and may indicate the current allocation status of the resources to VMs on the host device. In some embodiments, the resource information may also include resource utilization information. In some embodiments, the resource information for the host device(s) may be analyzed by the VM placement service to predict future demand for placement of VMs with particular combinations and quantities of resources, and slots can be predefined in the control plane in anticipation of that demand. In some embodiments, the resource information for the host device(s) may be analyzed by the VM placement service to locate suitable host devices for requested VMs and to dynamically define slots for the VMs. As indicated by the arrow returning to 800, the collection of resource information may be a continuous process.

As indicated at 710, the VM placement service receives a placement request for a VM with specified resource requirements, for example a specified combination and quantity of host resources for the VM. As indicated at 720, the VM placement service locates a host device that has the combination and quantity of resources to support the resource requirements of the VM. As indicated at 730, the VM placement service determines a slot for launching a VM on the host device; the slot indicates the host resources to be assigned to a VM on the host device. In some embodiments, the slot may be dynamically determined in response to the placement request. In some embodiments, the slot may be selected from one or more predefined slots for the host device. As indicated at 740, the VM placement service may then cause a VM to be launched on the host device that uses the host resources indicated by the determined slot. In some embodiments, the VM placement service provides the slot information to a control plane process that directs the host device to assign the host resources indicated by the slot to the VM, and to launch the VM.

Figure 8:
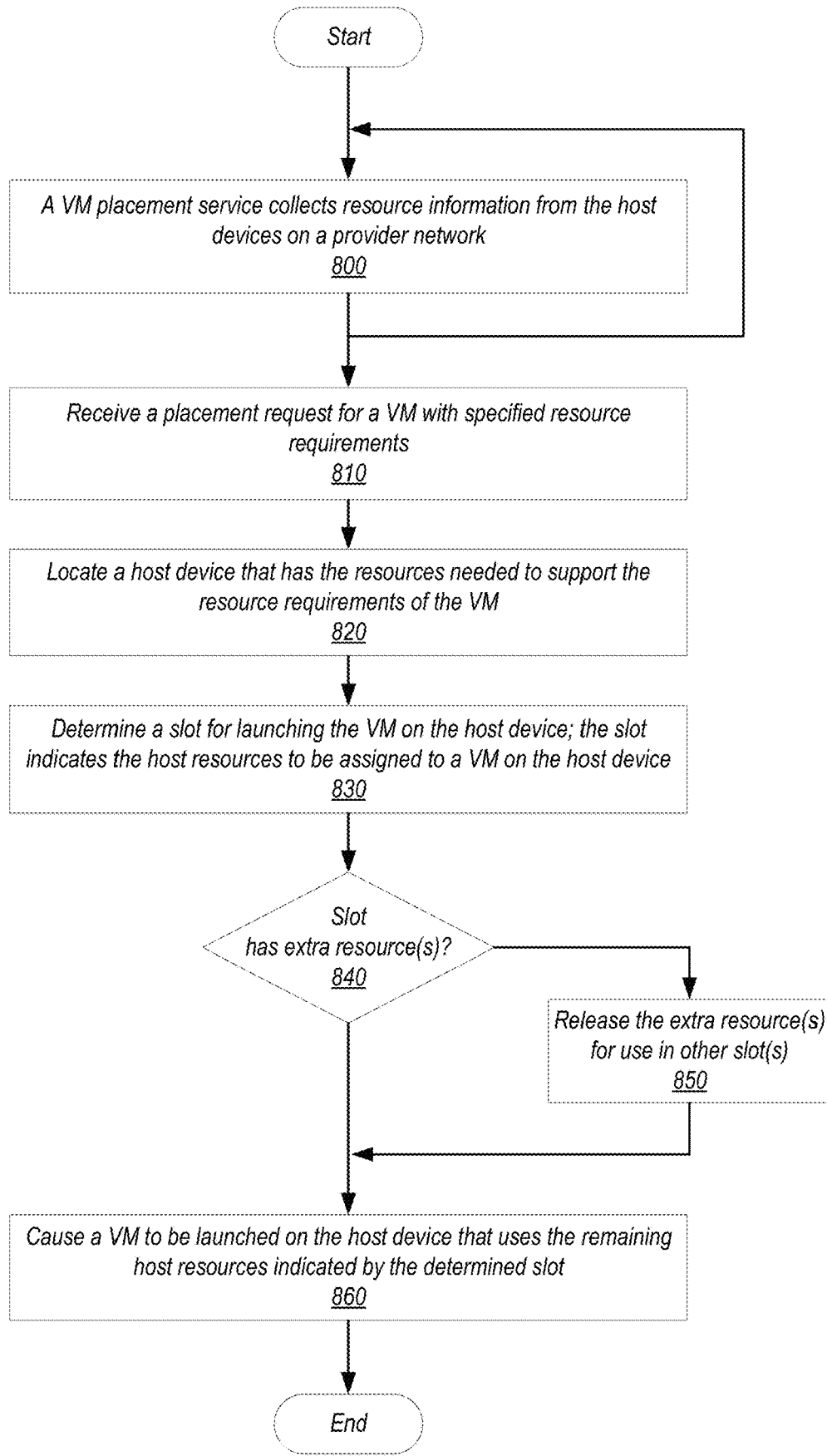
FIG. 8 is a flowchart of a method for releasing a host resource from one slot to provide an additional slot on the host device, according to some embodiments.

FIG. 8 is a flowchart of a method for releasing a host resource from one slot to provide an additional slot on the host device, according to some embodiments. As indicated at 800, a VM placement service collects resource information from the host devices on a provider network, for example as described in reference to element 700 of FIG. 7. As indicated at 810, the VM placement service receives a placement request for a VM with specified resource requirements, for example a specified combination and quantity of host resources for the VM. As indicated at 820, the VM placement service locates a host device that has the combination and quantity of resources needed to support the resource requirements of the VM. As indicated at 830, the VM placement service determines a slot for launching a VM on the host device; the slot indicates the host resources to be assigned to a VM on the host device. In some embodiments, the slot may be dynamically determined in response to the placement request. In some embodiments, the slot may be selected from one or more predefined slots for the host device.

At 840, if the slot has extra resources (e.g., a GPU or CPU that is not needed by the respective VM), then as indicated at 850 the extra resources may be released for use in other slots on the host device, for example as illustrated in FIG. 4B, and the method proceeds to element 860. Otherwise, the method proceeds directly to element 850. As indicated at 860, the VM placement service may cause a VM to be launched on the host device that uses the remaining host resources indicated by the determined slot. In some embodiments, the VM placement service provides the slot information to a control plane process that directs the host device to assign the host resources indicated by the slot to the VM, and to launch the VM.

Figure 9:
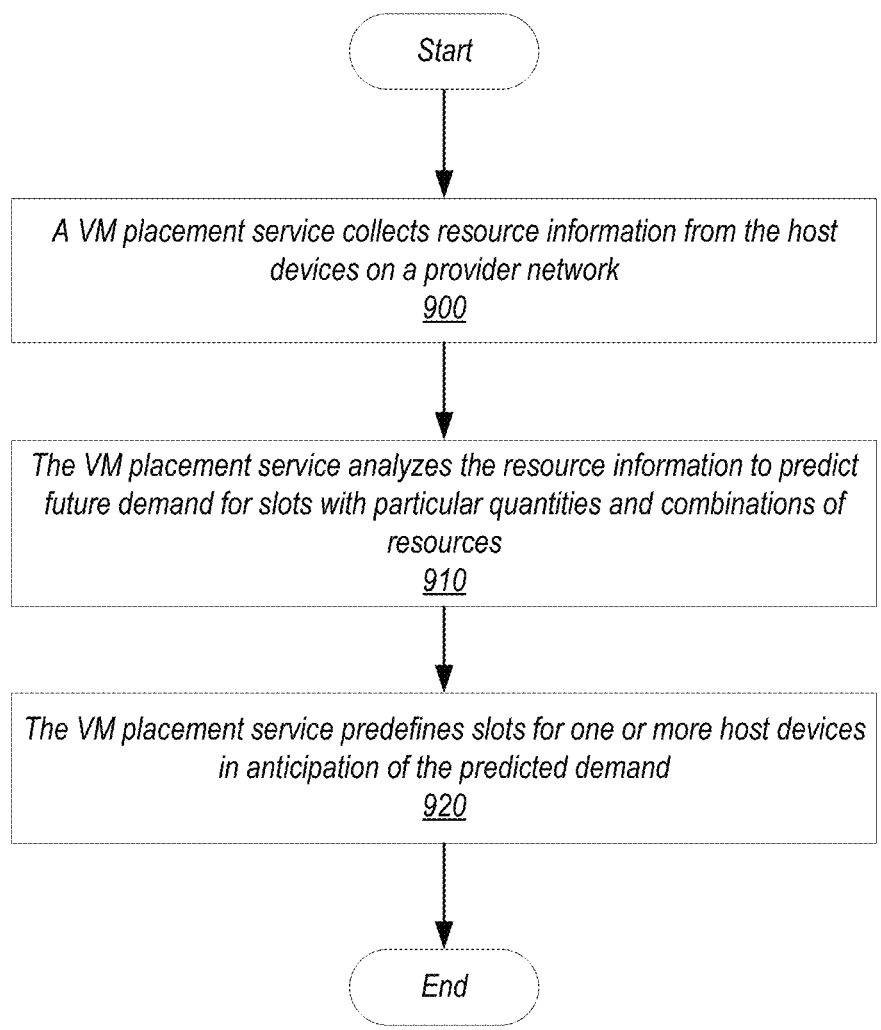
FIG. 9 is a flowchart of a method for pre-allocating slots based on predicted demand, according to some embodiments.

FIG. 9 is a flowchart of a method for pre-allocating slots based on predicted demand, according to some embodiments. As indicated at 900, a VM placement service collects resource information from the host devices on a provider network. The resource information for a given host device may indicate amounts of host resources (e.g., CPUs or CPU cores, GPUs, memory, disk, networking resources, accelerators, FPGAs, etc.) on the host device, and may indicate the current allocation status of the resources to VMs on the host device. In some embodiments, the resource information may also include resource utilization information (e.g., VM A is utilizing 70% of its CPU resources and 30% of its networking resources, VM B is utilizing 50% of its GPU resources and 100% of its networking resources, etc.) As indicated at 910, the VM placement service analyzes the resource information to predict future demand for slots with particular quantities and combinations of resources. As indicated at 920, the VM placement service predefines slots in the control plane for one or more host devices in anticipation of the predicted demand. The predefined slots can then be assigned to VMs in response to placement requests received from a control plane process.

FIG. 10 illustrates an example user interface for launching VMs with specified quantities and combinations of host resources, according to some embodiments. In some embodiments, a provider network service may provide a user interface 1000 to an API for submitting launch requests for VMs. The interface 1000 may include, but is not limited to, a user interface element 1002 via which the customer can identify a machine image (MI) that is to be used to launch the VM on the provider network, one or more user interface elements 1004 via which a customer may specify combinations and quantities of host resources (e.g., CPUs, GPUs, memory, disk, networking resources, accelerators, FPGAs, etc.) that are required for the VM, a user interface element 1006 via which the customer can specify the number of instances of the VM that the customer wants to launch, and a user interface element 1008 that the user can select to submit the launch request for the VM. The interface 1000 may also include one or more user interface elements 1010 that indicate status of a launch request (e.g., pending, provisioning, launched, executing, etc.) This example shows that the customer has requested one instance of a VM from machine image ABC123 that requires four CPUs and one GPU. Note that other combinations and quantities of host resources can be requested, for example one CPU and no GPU, one GPU and no CPU, one GPU and one accelerator, two CPUs and one FPGA, and so on. In some embodiments, the quantity of a given host resource type (e.g., CPU, GPU, etc.) may be specified anywhere within a range from 0 to a maximum number of the resource type supported by the host devices on the provider network. In some embodiments, the interface 1000 may also include user interface elements that allow customers to specify amounts or usage limits for one or more of the host resources. For example, for network resources, the customer may specify burst rate, throttling, bandwidth, and memory usage limits for the VM. As another example, for CPU resources, the customer may specify the number of CPU cores to be used by the 348, and may also specify CPU usage limits (e.g., burst rate) for the VM. As another example, for storage resources, the customer may specify an amount of storage space (e.g., in gigabytes or terabytes) that the VM will need.

Example Provider Network Environment

This section describes example provider network environments in which embodiments of the methods and apparatus described in reference to FIGS. 1 through 10 may be implemented. However, these example provider network environments are not intended to be limiting.

Figure 11:
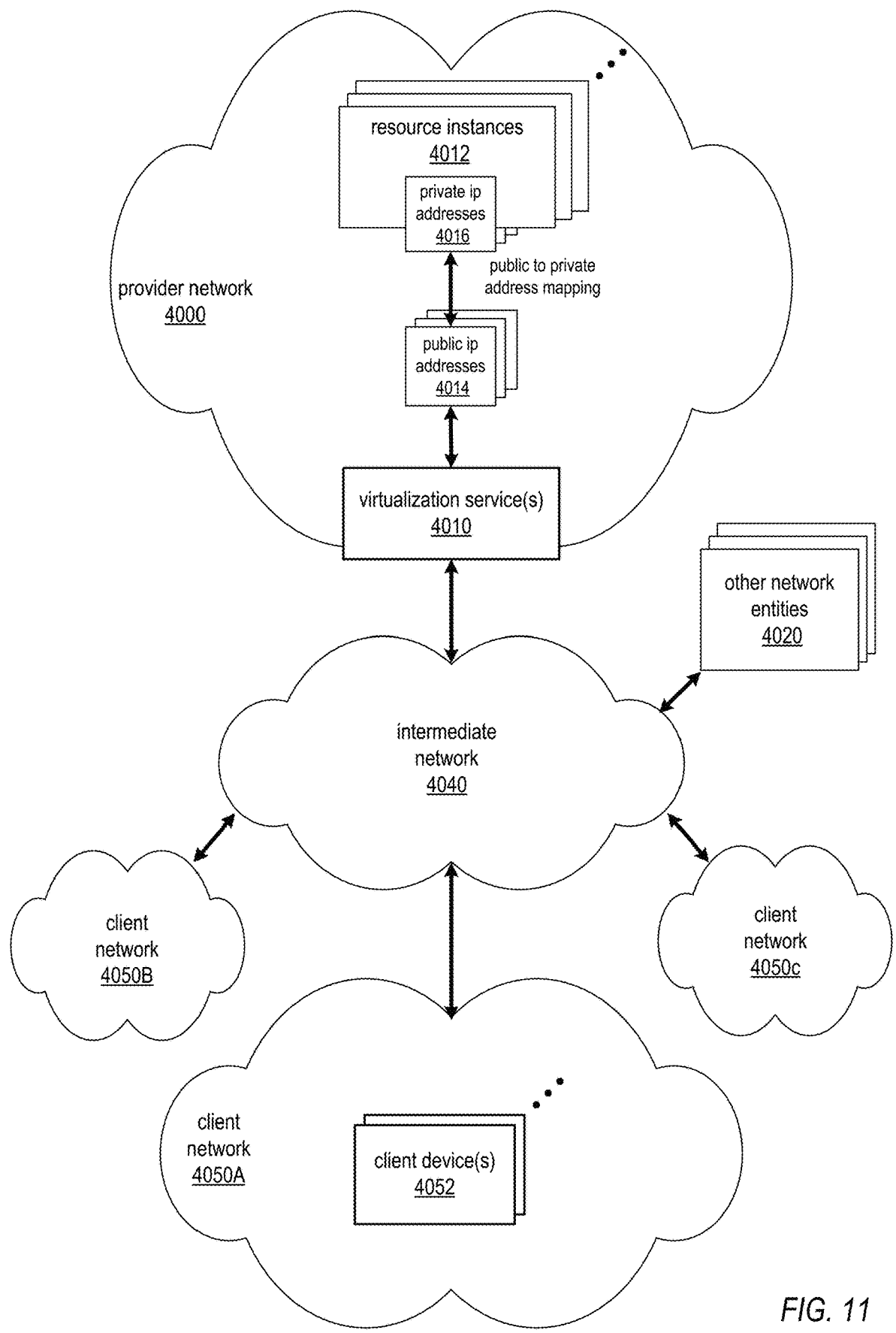
FIG. 11 illustrates an example provider network environment, according to some embodiments.

FIG. 11 illustrates an example provider network environment, according to some embodiments. A provider network 4000 may provide resource virtualization to clients via one or more virtualization services 4010 that allow clients to purchase, rent, or otherwise obtain instances 4012 of virtualized resources, including but not limited to computation and storage resources, implemented on devices within the provider network or networks in one or more data centers. Private IP addresses 4016 may be associated with the resource instances 4012; the private IP addresses are the internal network addresses of the resource instances 4012 on the provider network 4000. In some embodiments, the provider network 4000 may also provide public IP addresses 4014 and/or public IP address ranges (e.g., Internet Protocol version 4 (IPv4) or Internet Protocol version 6 (IPv6) addresses) that clients may obtain from the provider 4000.

Conventionally, the provider network 4000, via the virtualization services 4010, may allow a client of the service provider (e.g., a client that operates client network 4050A) to dynamically associate at least some public IP addresses 4014 assigned or allocated to the client with particular resource instances 4012 assigned to the client. The provider network 4000 may also allow the client to remap a public IP address 4014, previously mapped to one virtualized computing resource instance 4012 allocated to the client, to another virtualized computing resource instance 4012 that is also allocated to the client. Using the virtualized computing resource instances 4012 and public IP addresses 4014 provided by the service provider, a client of the service provider such as the operator of client network 4050A may, for example, implement client-specific applications and present the client's applications on an intermediate network 4040, such as the Internet. Other network entities 4020 on the intermediate network 4040 may then generate traffic to a destination public IP address 4014 published by the client network 4050A; the traffic is routed to the service provider data center, and at the data center is routed, via a network substrate, to the private IP address 4016 of the virtualized computing resource instance 4012 currently mapped to the destination public IP address 4014. Similarly, response traffic from the virtualized computing resource instance 4012 may be routed via the network substrate back onto the intermediate network 4040 to the source entity 4020.

Private IP addresses, as used herein, refer to the internal network addresses of resource instances in a provider network. Private IP addresses are only routable within the provider network. Network traffic originating outside the provider network is not directly routed to private IP addresses; instead, the traffic uses public IP addresses that are mapped to the resource instances. The provider network may include networking devices or appliances that provide network address translation (NAT) or similar functionality to perform the mapping from public IP addresses to private IP addresses and vice versa.

Public IP addresses, as used herein, are Internet routable network addresses that are assigned to resource instances, either by the service provider or by the client. Traffic routed to a public IP address is translated, for example via 1:1 network address translation (NAT), and forwarded to the respective private IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a private IP address of a resource instance is the default launch configuration for all resource instance types.

At least some public IP addresses may be allocated to or obtained by clients of the provider network 4000; a client may then assign their allocated public IP addresses to particular resource instances allocated to the client. These public IP addresses may be referred to as client public IP addresses, or simply client IP addresses. Instead of being assigned by the provider network 4000 to resource instances as in the case of standard IP addresses, client IP addresses may be assigned to resource instances by the clients, for example via an API provided by the service provider. Unlike standard IP addresses, client IP Addresses are allocated to client accounts and can be remapped to other resource instances by the respective clients as necessary or desired. A client IP address is associated with a client's account, not a particular resource instance, and the client controls that IP address until the client chooses to release it. Unlike conventional static IP addresses, client IP addresses allow the client to mask resource instance or availability zone failures by remapping the client's public IP addresses to any resource instance associated with the client's account. The client IP addresses, for example, enable a client to engineer around problems with the client's resource instances or software by remapping client IP addresses to replacement resource instances.

Figure 12:
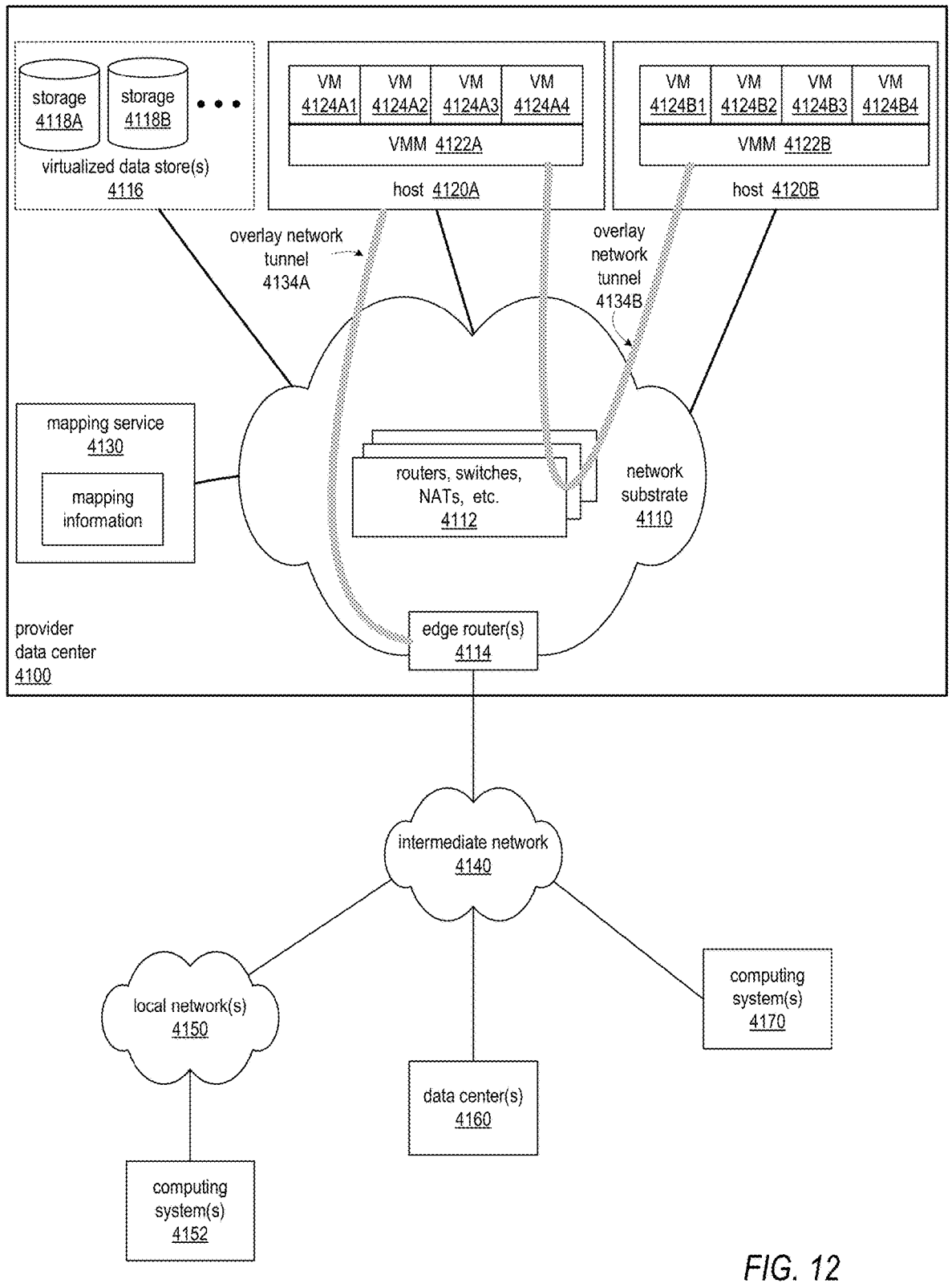
FIG. 12 illustrates an example data center that implements an overlay network on a network substrate using IP tunneling technology, according to some embodiments.

FIG. 12 illustrates an example data center that implements an overlay network on a network substrate using IP tunneling technology, according to some embodiments. A provider data center 4100 may include a network substrate that includes networking devices 4112 such as routers, switches, network address translators (NATs), and so on. Some embodiments may employ an Internet Protocol (IP) tunneling technology to provide an overlay network via which encapsulated packets may be passed through network substrate 4110 using tunnels. The IP tunneling technology may provide a mapping and encapsulating system for creating an overlay network on a network (e.g., a local network in data center 4100 of FIG. 12) and may provide a separate namespace for the overlay layer (the public IP addresses) and the network substrate 4110 layer (the private IP addresses). Packets in the overlay layer may be checked against a mapping directory (e.g., provided by mapping service 4130) to determine what their tunnel substrate target (private IP address) should be. The IP tunneling technology provides a virtual network topology (the overlay network); the interfaces (e.g., service APIs) that are presented to clients are attached to the overlay network so that when a client provides an IP address to which the client wants to send packets, the IP address is run in virtual space by communicating with a mapping service (e.g., mapping service 4130) that knows where the IP overlay addresses are.

In some embodiments, the IP tunneling technology may map IP overlay addresses (public IP addresses) to substrate IP addresses (private IP addresses), encapsulate the packets in a tunnel between the two namespaces, and deliver the packet to the correct endpoint via the tunnel, where the encapsulation is stripped from the packet. In FIG. 12, an example overlay network tunnel 4134A from a virtual machine (VM) 4124A on host 4120A to a device on the intermediate network 4150 and an example overlay network tunnel 4134B between a VM 4124B on host 4120B and a VM 4124C on host 4120C are shown. In some embodiments, a packet may be encapsulated in an overlay network packet format before sending, and the overlay network packet may be stripped after receiving. In other embodiments, instead of encapsulating packets in overlay network packets, an overlay network address (public IP address) may be embedded in a substrate address (private IP address) of a packet before sending, and stripped from the packet address upon receiving. As an example, the overlay network may be implemented using 32-bit IPv4 (Internet Protocol version 4) addresses as the public IP addresses, and the IPv4 addresses may be embedded as part of 128-bit IPv6 (Internet Protocol version 6) addresses used on the substrate network as the private IP addresses.

Referring to FIG. 12, at least some networks in which embodiments may be implemented may include hardware virtualization technology that enables multiple operating systems to run concurrently on a host computer (e.g., hosts 4120A and 4120B of FIG. 12), i.e. as virtual machines (VMs) 4124 on the hosts 4120. The VMs 4124 may, for example, be executed in slots on the hosts 4120 that are rented or leased to clients of a network provider. A hypervisor, or virtual machine monitor (VMM) 4122, on a host 4120 presents the VMs 4124 on the host with a virtual platform and monitors the execution of the VMs 4124. Each VM 4124 may be provided with one or more private IP addresses; the VMM 4122 on a host 4120 may be aware of the private IP addresses of the VMs 4124 on the host. A mapping service 4130 may be aware of all network IP prefixes and the IP addresses of routers or other devices serving IP addresses on the local network. This includes the IP addresses of the VMMs 4122 serving multiple VMs 4124. The mapping service 4130 may be centralized, for example on a server system, or alternatively may be distributed among two or more server systems or other devices on the network. A network may, for example, use the mapping service technology and IP tunneling technology to, for example, route data packets between VMs 4124 on different hosts 4120 within the data center 4100 network; note that an interior gateway protocol (IGP) may be used to exchange routing information within such a local network.

In addition, a network such as the provider data center 4100 network (which is sometimes referred to as an autonomous system (AS)) may use the mapping service technology, IP tunneling technology, and routing service technology to route packets from the VMs 4124 to Internet destinations, and from Internet sources to the VMs 4124. Note that an external gateway protocol (EGP) or border gateway protocol (BGP) is typically used for Internet routing between sources and destinations on the Internet. FIG. 12 shows an example provider data center 4100 implementing a network that provides resource virtualization technology and that provides full Internet access via edge router(s) 4114 that connect to Internet transit providers, according to some embodiments. The provider data center 4100 may, for example, provide clients the ability to implement virtual computing systems (VMs 4124) via a hardware virtualization service and the ability to implement virtualized data stores 4116 on storage resources 4118 via a storage virtualization service.

The data center 4100 network may implement IP tunneling technology, mapping service technology, and a routing service technology to route traffic to and from virtualized resources, for example to route packets from the VMs 4124 on hosts 4120 in data center 4100 to Internet destinations, and from Internet sources to the VMs 4124. Internet sources and destinations may, for example, include computing systems 4170 connected to the intermediate network 4140 and computing systems 4152 connected to local networks 4150 that connect to the intermediate network 4140 (e.g., via edge router(s) 4114 that connect the network 4150 to Internet transit providers). The provider data center 4100 network may also route packets between resources in data center 4100, for example from a VM 4124 on a host 4120 in data center 4100 to other VMs 4124 on the same host or on other hosts 4120 in data center 4100.

A service provider that provides data center 4100 may also provide additional data center(s) 4160 that include hardware virtualization technology similar to data center 4100 and that may also be connected to intermediate network 4140. Packets may be forwarded from data center 4100 to other data centers 4160, for example from a VM 4124 on a host 4120 in data center 4100 to another VM on another host in another, similar data center 4160, and vice versa.

While the above describes hardware virtualization technology that enables multiple operating systems to run concurrently on host computers as virtual machines (VMs) on the hosts, where the VMs may be instantiated on slots on hosts that are rented or leased to clients of the network provider, the hardware virtualization technology may also be used to provide other computing resources, for example storage resources 4118, as virtualized resources to clients of a network provider in a similar manner.

Figure 13:
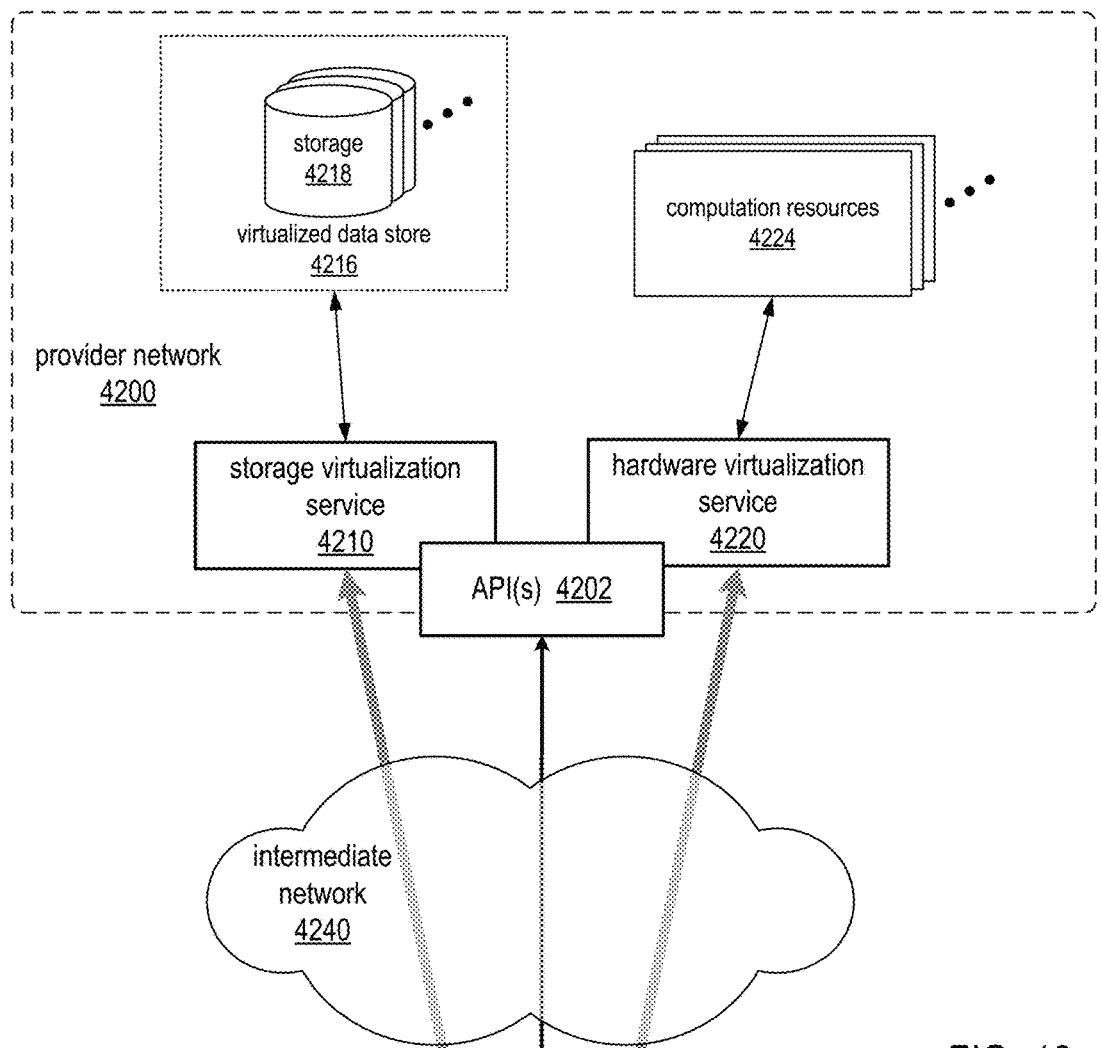
FIG. 13 is a block diagram of an example provider network that provides a storage virtualization service and a hardware virtualization service to clients, according to some embodiments.
Figure 13:
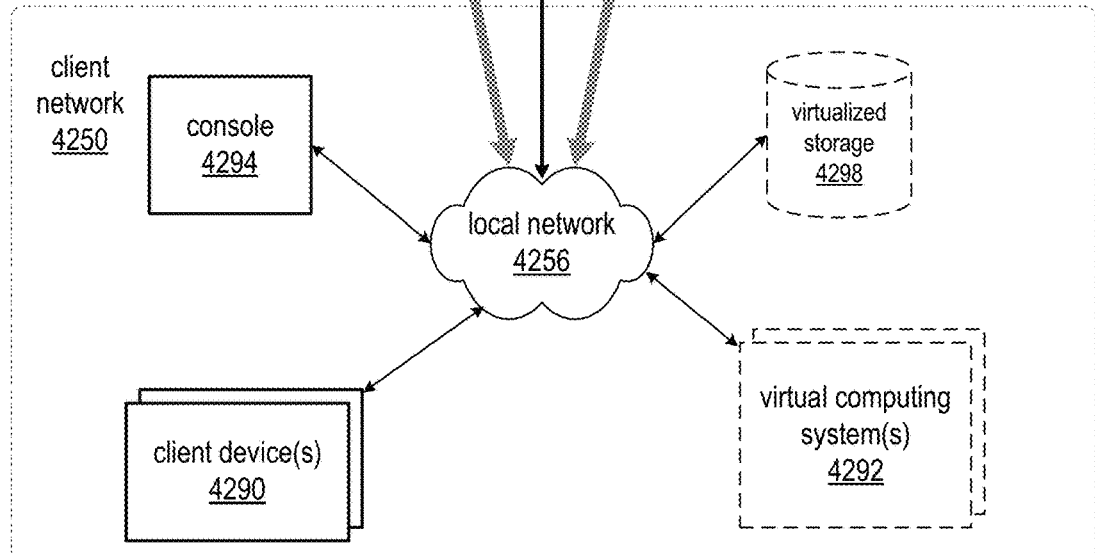

FIG. 13 is a block diagram of an example provider network that provides a storage virtualization service and a hardware virtualization service to clients, according to some embodiments. Hardware virtualization service 4220 provides multiple computation resources 4224 (e.g., VMs) to clients. The computation resources 4224 may, for example, be rented or leased to clients of the provider network 4200 (e.g., to a client that implements client network 4250). Each computation resource 4224 may be provided with one or more private IP addresses. Provider network 4200 may be configured to route packets from the private IP addresses of the computation resources 4224 to public Internet destinations, and from public Internet sources to the computation resources 4224.

Provider network 4200 may provide a client network 4250, for example coupled to intermediate network 4240 via local network 4256, the ability to implement virtual computing systems 4292 via hardware virtualization service 4220 coupled to intermediate network 4240 and to provider network 4200. In some embodiments, hardware virtualization service 4220 may provide one or more APIs 4202, for example a web services interface, via which a client network 4250 may access functionality provided by the hardware virtualization service 4220, for example via a console 4294. In some embodiments, at the provider network 4200, each virtual computing system 4292 at client network 4250 may correspond to a computation resource 4224 that is leased, rented, or otherwise provided to client network 4250.

From an instance of a virtual computing system 4292 and/or another client device 4290 or console 4294, the client may access the functionality of storage virtualization service 4210, for example via one or more APIs 4202, to access data from and store data to a virtual data store 4216 provided by the provider network 4200. In some embodiments, a virtualized data store gateway (not shown) may be provided at the client network 4250 that may locally cache at least some data, for example frequently accessed or critical data, and that may communicate with virtualized data store service 4210 via one or more communications channels to upload new or modified data from a local cache so that the primary store of data (virtualized data store 4216) is maintained. In some embodiments, a user, via a virtual computing system 4292 and/or on another client device 4290, may mount and access virtual data store 4216 volumes, which appear to the user as local virtualized storage 4298.

While not shown in FIG. 13, the virtualization service(s) may also be accessed from resource instances within the provider network 4200 via API(s) 4202. For example, a client, appliance service provider, or other entity may access a virtualization service from within a respective virtual network on the provider network 4200 via an API 4202 to request allocation of one or more resource instances within the virtual network or within another virtual network.

Figure 14:
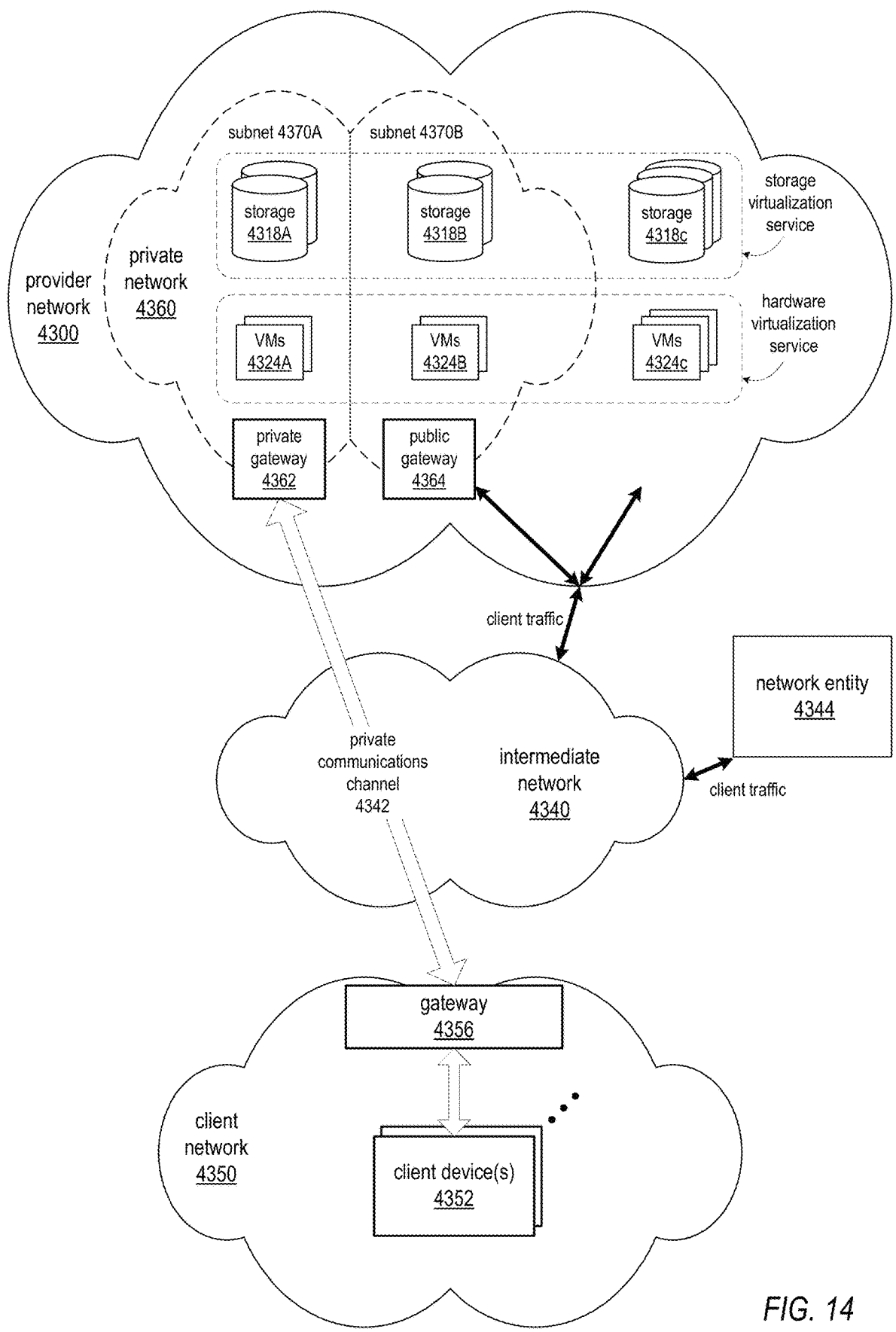
FIG. 14 illustrates an example provider network that provides virtual networks to at least some clients, according to some embodiments.

FIG. 14 illustrates an example provider network that provides virtual networks on the provider network to at least some clients, according to some embodiments. A client's virtual network 4360 on a provider network 4300, for example, enables a client to connect their existing infrastructure (e.g., devices 4352) on client network 4350 to a set of logically isolated resource instances (e.g., VMs 4324A and 4324B and storage 4318A and 4318B), and to extend management capabilities such as security services, firewalls, and intrusion detection systems to include their resource instances.

A client's virtual network 4360 may be connected to a client network 4350 via a private communications channel 4342. A private communications channel 4342 may, for example, be a tunnel implemented according to a network tunneling technology or some other technology over an intermediate network 4340. The intermediate network may, for example, be a shared network or a public network such as the Internet. Alternatively, a private communications channel 4342 may be implemented over a direct, dedicated connection between virtual network 4360 and client network 4350.

A public network may be broadly defined as a network that provides open access to and interconnectivity among a plurality of entities. The Internet, or World Wide Web (WWW) is an example of a public network. A shared network may be broadly defined as a network to which access is limited to two or more entities, in contrast to a public network to which access is not generally limited. A shared network may, for example, include one or more local area networks (LANs) and/or data center networks, or two or more LANs or data center networks that are interconnected to form a wide area network (WAN). Examples of shared networks may include, but are not limited to, corporate networks and other enterprise networks. A shared network may be anywhere in scope from a network that covers a local area to a global network. Note that a shared network may share at least some network infrastructure with a public network, and that a shared network may be coupled to one or more other networks, which may include a public network, with controlled access between the other network(s) and the shared network. A shared network may also be viewed as a private network, in contrast to a public network such as the Internet. In some embodiments, either a shared network or a public network may serve as an intermediate network between a provider network and a client network.

To establish a virtual network 4360 for a client on provider network 4300, one or more resource instances (e.g., VMs 4324A and 4324B and storage 4318A and 4318B) may be allocated to the virtual network 4360. Note that other resource instances (e.g., storage 4318C and VMs 4324C) may remain available on the provider network 4300 for other client usage. A range of public IP addresses may also be allocated to the virtual network 4360. In addition, one or more networking devices (routers, switches, etc.) of the provider network 4300 may be allocated to the virtual network 4360. A private communications channel 4342 may be established between a private gateway 4362 at virtual network 4360 and a gateway 4356 at client network 4350.

In some embodiments, in addition to, or instead of, a private gateway 4362, virtual network 4360 may include a public gateway 4364 that enables resources within virtual network 4360 to communicate directly with entities (e.g., network entity 4344) via intermediate network 4340, and vice versa, instead of or in addition to via private communications channel 4342.

Virtual network 4360 may be, but is not necessarily, subdivided into two or more subnetworks, or subnets, 4370. For example, in implementations that include both a private gateway 4362 and a public gateway 4364, a virtual network 4360 may be subdivided into a subnet 4370A that includes resources (VMs 4324A and storage 4318A, in this example) reachable through private gateway 4362, and a subnet 4370B that includes resources (VMs 4324B and storage 4318B, in this example) reachable through public gateway 4364.

The client may assign particular client public IP addresses to particular resource instances in virtual network 4360. A network entity 4344 on intermediate network 4340 may then send traffic to a public IP address published by the client; the traffic is routed, by the provider network 4300, to the associated resource instance. Return traffic from the resource instance is routed, by the provider network 4300, back to the network entity 4344 over intermediate network 4340. Note that routing traffic between a resource instance and a network entity 4344 may require network address translation to translate between the public IP address and the private IP address of the resource instance.

Some embodiments may allow a client to remap public IP addresses in a client's virtual network 4360 as illustrated in FIG. 14 to devices on the client's external network 4350. When a packet is received (e.g., from network entity 4344), the network 4300 may determine that the destination IP address indicated by the packet has been remapped to an endpoint on external network 4350 and handle routing of the packet to the respective endpoint, either via private communications channel 4342 or via the intermediate network 4340. Response traffic may be routed from the endpoint to the network entity 4344 through the provider network 4300, or alternatively may be directly routed to the network entity 4344 by the client network 4350. From the perspective of the network entity 4344, it appears as if the network entity 4344 is communicating with the public IP address of the client on the provider network 4300. However, the network entity 4344 has actually communicated with the endpoint on client network 4350.

While FIG. 14 shows network entity 4344 on intermediate network 4340 and external to provider network 4300, a network entity may be an entity on provider network 4300. For example, one of the resource instances provided by provider network 4300 may be a network entity that sends traffic to a public IP address published by the client.

Illustrative System

In some embodiments, a system that implements a portion or all of the methods and apparatus for allocating host device resources to virtual machines (VMs) in provider network environments as described herein may include a general-purpose computer system that includes or is configured to access one or more computer-accessible media, such as computer system 5000 illustrated in FIG. 15. In the illustrated embodiment, computer system 5000 includes one or more processors 5010 coupled to a system memory 5020 via an input/output (I/O) interface 5030. Computer system 5000 further includes a network interface 5040 coupled to I/O interface 5030. While FIG. 15 shows computer system 5000 as a single computing device, in various embodiments a computer system 5000 may include one computing device or any number of computing devices configured to work together as a single computer system 5000.

In various embodiments, computer system 5000 may be a uniprocessor system including one processor 5010, or a multiprocessor system including several processors 5010 (e.g., two, four, eight, or another suitable number). Processors 5010 may be any suitable processors capable of executing instructions. For example, in various embodiments, processors 5010 may be general-purpose or embedded processors implementing any of a variety of instruction set architectures (ISAs), such as the x86, PowerPC, SPARC, or MIPS ISAs, or any other suitable ISA. In multiprocessor systems, each of processors 5010 may commonly, but not necessarily, implement the same ISA.

System memory 5020 may be configured to store instructions and data accessible by processor(s) 5010. In various embodiments, system memory 5020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for providing client-defined rules for clients' resources in provider network environments, are shown stored within system memory 5020 as code 5025 and data 5026.

In one embodiment, I/O interface 5030 may be configured to coordinate I/O traffic between processor 5010, system memory 5020, and any peripheral devices in the device, including network interface 5040 or other peripheral interfaces. In some embodiments, I/O interface 5030 may perform any necessary protocol, timing or other data transformations to convert data signals from one component (e.g., system memory 5020) into a format suitable for use by another component (e.g., processor 5010). In some embodiments, I/O interface 5030 may include support for devices attached through various types of peripheral buses, such as a variant of the Peripheral Component Interconnect (PCI) bus standard or the Universal Serial Bus (USB) standard, for example. In some embodiments, the function of I/O interface 5030 may be split into two or more separate components, such as a north bridge and a south bridge, for example. Also, in some embodiments some or all of the functionality of I/O interface 5030, such as an interface to system memory 5020, may be incorporated directly into processor 5010.

Network interface 5040 may be configured to allow data to be exchanged between computer system 5000 and other devices 5060 attached to a network or networks 5050, such as other computer systems or devices as illustrated in FIGS. 1 through 14, for example. In various embodiments, network interface 5040 may support communication via any suitable wired or wireless general data networks, such as types of Ethernet network, for example. Additionally, network interface 5040 may support communication via telecommunications/telephony networks such as analog voice networks or digital fiber communications networks, via storage area networks such as Fibre Channel SANs, or via any other suitable type of network and/or protocol.

In some embodiments, system memory 5020 may be one embodiment of a computer-accessible medium configured to store program instructions and data as described above for FIGS. 1 through 10 for allocating host device resources to VMs in provider network environments. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 5000 via I/O interface 5030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computer system 5000 as system memory 5020 or another type of memory. Further, a computer-accessible medium may include transmission media or signals such as electrical, electromagnetic, or digital signals, conveyed via a communication medium such as a network and/or a wireless link, such as may be implemented via network interface 5040.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A computer system including a processor coupled to a memory, the memory including instructions that upon execution cause the system to:
   collect resource information from host devices on a provider network, wherein the resource information for a given host device indicates allocation of host resources to virtual machines (VMs) on the host device;
   receive placement requests for virtual machines (VMs) to be launched on the host devices on the provider network, wherein each placement request specifies host resources to be allocated to a respective VM;
   for each placement request:
      locate a host device on the provider network that can provide the specified host resources for the respective VM based on the collected resource information;
      determine a slot for launching the respective VM on the host device, wherein the slot indicates host resources to be assigned to the respective VM on the host device;
      responsive to determining that the slot includes an extra host resource beyond the specified host resources for the respective VM, release the extra host resource for use in one or more other slots on the host device; and
      cause a VM to be launched on the host device that uses remaining host resources indicated by the slot.

2. The system as recited in claim 1, wherein the host resources on a given host device include one or more of central processing unit (CPU) cores, graphics processing units (GPUs), memory, disk, networking resources, accelerators, or field-programmable gate arrays (FPGAs).

3. The system as recited in claim 2, wherein the networking resources include burst rate, throttling, and total bandwidth utilization for network ingress and for network egress.

4. The system as recited in claim 1, wherein, to determine a slot for launching the respective VM on the host device, the instructions upon execution further cause the system to select the slot from one or more predefined slots for the host device.

5. The system as recited in claim 1, wherein, to determine a slot for launching the respective VM on the host device, the instructions upon execution further cause the system to analyze the resource information collected from the host devices to dynamically define the slot for launching the respective VM on the located host device.

6. The system as recited in claim 1, wherein the resource information collected from the host devices further includes resource utilization information, and wherein the instructions upon execution further cause the system to:
   analyze the resource information collected from the host devices to predict future demand for placement of VMs with particular amounts of the one or more host resources on the host devices; and
   predefine slots for the host devices that include at least the particular amounts of the one or more host resources.

7. A method, comprising:
performing, by one or more devices on a provider network that includes a plurality of host devices:
   receiving a placement request for a virtual machine (VM) to be launched on a host device on the provider network, wherein the placement request specifies one or more host resources to be allocated to the VM;
   locating a target host device on the provider network that can provide the specified one or more host resources for the VM;
   determining a slot for launching the respective VM on the host device, wherein the slot indicates host resources to be assigned to the respective VM on the host device;
   responsive to determining that the slot includes an extra host resource beyond the specified one or more host resources for the respective VM, releasing the extra host resource for use in one or more other slots on the host device; and causing the VM to be launched on the target host device that uses remaining host resources indicated by the slot.

8. The method as recited in claim 7, further comprising:
receiving a second placement request for a second VM to be launched on a host device on the provider network, wherein the second placement request specifies a different one or more host resources to be allocated to the second VM;
determining a second slot for launching the second VM on the target host device, wherein the second slot indicates the host resources to be assigned to the second VM on the target host device; and
causing the second VM to be launched on the target host device, wherein the second VM uses the host resources indicated by the second slot.

9. The method as recited in claim 7, wherein to release the extra host resource comprises assigning the released extra host resource to a different slot for launching another VM on the host device.

10. The method as recited in claim 7, wherein the one or more host resources on a given host device include one or more of central processing unit (CPU) cores, graphics processing units (GPUs), memory, disk, networking resources, accelerators, or field-programmable gate arrays (FPGAs).

11. The method as recited in claim 10, wherein the networking resources include burst rate, throttling, and total bandwidth utilization for network ingress and for network egress.

12. The method as recited in claim 10, wherein the one or more host resources on a given host device include shared resources, and wherein the host resources further include usage limits to be applied to the VMs for the shared resources on the host device or amounts of the shared resources to be allocated to the VMs on the host device.

13. The method as recited in claim 7, wherein determining a slot for launching the respective VM on the host device comprises dynamically determining the host resources to be assigned to the respective VM on the host device based on resource information collected from the located host device and defining the slot for launching the respective VM on the located host device.

14. The method as recited in claim 7, wherein determining a slot for launching the respective VM on the host device comprises selecting the slot from one or more predefined slots for the target host device.

15. The method as recited in claim 7, further comprising:
collecting resource information from the host devices on the provider network, wherein the resource information indicates allocation of host resources to VMs on the host devices and resource utilization information for the VMs on the host devices;
analyzing the resource information collected from the host devices to predict future demand for placement of VMs with particular amounts of the one or more host resources on the host devices; and
predefining slots for the host devices that include at least the particular amounts of the one or more host resources.

16. A non-transitory computer-readable storage medium storing program instructions that when executed on a computing device cause the computing device to:
receive placement requests for virtual machines (VMs) to be launched on a provider network, wherein each placement request specifies an amount for the one or more host resources to be allocated to a respective VM;
locate host devices on the provider network that can provide the specified amounts of the one or more host resources for the VMs;
determine slots for launching the VMs on the host devices, wherein each slot indicates host resources to be assigned to a respective VM on a respective host device;
responsive to determining that one of the slots includes an extra host resource beyond the specified one or more host resources for the respective VM, release the extra host resource for use in one or more other slots; and
cause the VMs to be launched on the located host devices, wherein the VMs use host resources indicated by the respective slots.

17. The system as recited in claim 16, wherein the one or more host resources on a given host device include one or more of central processing unit (CPU) cores, graphics processing units (GPUs), memory, disk, networking resources, accelerators, or field-programmable gate arrays (FPGAs).

18. The non-transitory computer-readable storage medium as recited in claim 16, wherein, to determine a slot for launching a particular VM, the program instructions when executed on the computing device cause the computing device to select the slot from one or more predefined slots for the host devices.

19. The non-transitory computer-readable storage medium as recited in claim 16, wherein, to determine a slot for launching a particular VM on a particular host device, the program instructions when executed on the computing device cause the computing device to analyze resource information collected from the particular host device to dynamically determine the host resources to be assigned to the particular VM on the particular host device and define the slot for launching the particular VM on the particular host device.

20. The non-transitory computer-readable storage medium as recited in claim 16, wherein the program instructions when executed on the computing device cause the computing device to:
analyze resource information collected from the host devices to predict future demand for placement of VMs with particular amounts of the one or more host resources on the host devices; and
predefine slots for the host devices that include at least the particular amounts of the one or more host resources.

* * * * *